United States Patent
Kamei et al.

(10) Patent No.: US 8,867,873 B2
(45) Date of Patent: Oct. 21, 2014

(54) ARRAYED WAVEGUIDE GRATING

(75) Inventors: Shin Kamei, Atsugi (JP); Yasuyuki Inoue, Atsugi (JP); Mikitaka Itoh, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 467 days.

(21) Appl. No.: 13/001,347

(22) PCT Filed: Jun. 30, 2009

(86) PCT No.: PCT/JP2009/061989
§ 371 (c)(1),
(2), (4) Date: Dec. 23, 2010

(87) PCT Pub. No.: WO2010/007884
PCT Pub. Date: Jan. 21, 2010

(65) Prior Publication Data
US 2011/0110624 A1     May 12, 2011

(30) Foreign Application Priority Data

Jul. 14, 2008 (JP) .................................. 2008-182988
Dec. 2, 2008 (JP) .................................. 2008-307788

(51) Int. Cl.
*G02B 6/28* (2006.01)
*G02B 6/12* (2006.01)

(52) U.S. Cl.
CPC .......... *G02B 6/12026* (2013.01); *G02B 6/1203* (2013.01); *G02B 6/12016* (2013.01); *G02B 6/12014* (2013.01); *G02B 6/12028* (2013.01); *G02B 6/12019* (2013.01)
USPC .......................................... 385/24; 359/237

(58) Field of Classification Search
CPC ........... G02B 6/12014; G02B 6/12016; G02B 6/12019; G02B 6/12026; G02B 6/12028; G02B 6/1203
USPC .......................................... 385/24; 359/237
See application file for complete search history.

(56) References Cited

U.S. PATENT DOCUMENTS 4,964,131 A * 10/1990 Liu et al. ............................ 372/6
5,034,603 A * 7/1991 Wilson ....................... 250/227.27

(Continued)

FOREIGN PATENT DOCUMENTS

JP     11218624 A  *  8/1999  .............. G02B 6/12
JP     3112246         9/2000

(Continued)

OTHER PUBLICATIONS

Besse et al., "New 2×2 and 1×3 Multimode Interference Couplers with Free Selection of Power Splitting Ratios," Journal of Lightwave Technology, vol. 14, No. 10, Oct. 1996, p. 2286.*

(Continued)

*Primary Examiner* — Peter Radkowski
(74) *Attorney, Agent, or Firm* — Workman Nydegger

(57) ABSTRACT

An optical wavelength multi/demultiplexing circuit is provided in which temperature dependence at a transmission center wavelength remained in an athermalized AWG is compensated. An AWG according to an embodiment of the present invention is compensated for the main temperature dependence at the transmission center wavelength. The AWG comprises an optical splitter, a first and second arm waveguides, an optical mode combining coupler and a multimode waveguide between an input/output waveguide and a slab waveguide. The optical mode combining coupler couples fundamental mode light from the first arm waveguide as fundamental mode and the fundamental mode light from the second arm waveguide as first mode. The multimode waveguide is capable of propagating the fundamental and first mode light. This AWG is configured such that the temperature dependence remained in the arrayed waveguide grating is compensated by changing the optical path length difference between the first and second arm waveguides with temperature.

20 Claims, 36 Drawing Sheets

(56) References Cited

U.S. PATENT DOCUMENTS

| | | | |
|---|---|---|---|
| 5,798,834 A * | 8/1998 | Brooker | 356/477 |
| 6,222,955 B1 * | 4/2001 | Lagali et al. | 385/20 |
| 6,266,464 B1 * | 7/2001 | Day et al. | 385/37 |
| 6,289,147 B1 * | 9/2001 | Bulthuis et al. | 385/24 |
| 6,292,597 B1 * | 9/2001 | Lagali et al. | 385/1 |
| 6,298,186 B1 * | 10/2001 | He | 385/37 |
| 6,304,687 B1 * | 10/2001 | Inoue et al. | 385/14 |
| 6,341,031 B1 * | 1/2002 | McBrien et al. | 359/237 |
| 6,445,853 B1 * | 9/2002 | Kashihara et al. | 385/37 |
| 6,466,707 B1 * | 10/2002 | Dawes et al. | 385/14 |
| 6,606,433 B2 * | 8/2003 | Oguma et al. | 385/37 |
| 6,650,458 B1 * | 11/2003 | Prosyk et al. | 359/276 |
| 7,539,368 B2 | 5/2009 | Hasegawa et al. | |
| 2001/0036005 A1 * | 11/2001 | Hatayama et al. | 359/337.1 |
| 2002/0025103 A1 * | 2/2002 | Thaniyavarn | 385/15 |
| 2002/0097961 A1 * | 7/2002 | Kazarinov et al. | 385/37 |
| 2002/0159703 A1 * | 10/2002 | McGreer | 385/43 |
| 2002/0181871 A1 * | 12/2002 | Saito et al. | 385/37 |
| 2002/0181917 A1 * | 12/2002 | Noro et al. | 385/132 |
| 2003/0031406 A1 * | 2/2003 | Saida et al. | 385/27 |
| 2003/0152304 A1 * | 8/2003 | Gonthier et al. | 385/1 |
| 2003/0174955 A1 * | 9/2003 | Chen et al. | 385/42 |
| 2003/0223694 A1 * | 12/2003 | Nikonov et al. | 385/39 |
| 2004/0136647 A1 * | 7/2004 | Mizuno et al. | 385/24 |
| 2005/0195879 A1 * | 9/2005 | Ishizu | 372/66 |
| 2005/0275921 A1 * | 12/2005 | Haus et al. | 359/247 |
| 2006/0198579 A1 | 9/2006 | Bulthuis et al. | |
| 2007/0201784 A1 * | 8/2007 | Kissa et al. | 385/8 |
| 2007/0292079 A1 * | 12/2007 | Jones | 385/27 |

FOREIGN PATENT DOCUMENTS

| | | |
|---|---|---|
| JP | 2001-116937 | 4/2001 |
| JP | 2003-149474 | 5/2003 |
| JP | 3498650 | 12/2003 |
| JP | 2006-284632 | 10/2006 |
| JP | 2007-316335 | 12/2007 |
| WO | WO98/36299 | 8/1998 |
| WO | WO2007/026925 | 3/2007 |
| WO | PCT/JP2009/061989 | 8/2009 |

OTHER PUBLICATIONS

Notification Concerning Transmittal of Translation of the International Preliminary Report on Patentability (Form PCT/IB/338) of related Japanese International Application No. PCT/JP2009/061989 dated Feb. 17, 2011.

Junichi Hasegawa et al., *Ultra-wide Temperature Range (-30~70° C.) Operation of Athermal AWG Module Using Pure Aluminum Plate*, 2006 Optical Society of America, pp. 226, English Translation attached.

J.B.D. Soole et al., *Athermalisation of Silica Arrayed Waveguide Grating Multiplexers*, Electronics Letters, vol. 39, No. 16, Aug. 7, 2003, pp. 1182-1184.

Juerg Leuthold et al., *Multimode Interference Couplers for the Conversion and Combining of Zero- and First-Order Modes*, Journal of Lightwave Technology, vol. 16, No. 7, Jul. 1998, pp. 1228-1239.

Zhiyi Zhang et al., *Planar Waveguide-based Silica-polymer Hybrid Variable Optical Attenuator and its Associated Polymers*, Applied Optics, vol. 44, No. 12, Apr. 20, 2005, pp. 2402-2408.

* cited by examiner

ARRAYED WAVEGUIDE GRATING

TECHNICAL FIELD

The present invention relates to an arrayed waveguide grating and more particularly, to an arrayed waveguide grating type optical wavelength multiplexing and demultiplexing circuit in which temperature dependence of transmission wavelength is compensated.

BACKGROUND ART

Research and development of a planar lightwave circuit (PLC) composed of a silica-based glass waveguide formed on a silicon substrate have been actively conducted. An arrayed waveguide grating (AWG) utilizing such PLC technique is a circuit for optical wavelength multiplexing and demultiplexing and plays an important role as a component for optical communications.

The AWG has temperature dependence on a transmission wavelength of light to be multiplexed and demultiplexed. This is because the effective refractive index of a silica-based glass waveguides constituting the AWG has temperature dependence. Therefore, normally in an AWG, a temperature adjusting device is required in order to keep the wavelength transmission characteristics constant.

In order to eliminate the temperature adjusting device additionally required for an AWG, a method of reducing the temperature dependence of transmission wavelength of an AWG has been developed. This method is disclosed in, for example, Patent Literatures 1 and 2 (PTL 1 and PTL 2). The AWG with the temperature dependence of transmission wavelength being reduced is referred to as a temperature insensitive AWG or an athermal AWG. The athermal AWG disclosed in Patent Literatures 1 and 2 is realized by forming a groove so as to intersect a light wave traveling axis and inserting into the groove a material having a temperature coefficient of refractive index different from the temperature coefficient of effective refractive index of the waveguide (hereinafter referred to as a "temperature compensating material") in each optical path (arrayed waveguide or slab waveguide) within the AWG.

FIG. 35A is a diagram showing a conventional configuration example of an athermal AWG of a type forming a groove in a slab waveguide. The athermal AWG 4100 comprises first input/output waveguides 4101, a first slab waveguide 4102, arrayed waveguides 4103, a second slab waveguide 4104, second input/output waveguides 4105 and grooves 4106. The grooves 4106 are filled with a temperature compensating material. In this configuration example, the grooves 4106 are formed in the first slab waveguide 4102.

FIG. 35B is a diagram showing a sectional structure along a segment XXXVB-XXXVB' in FIG. 35A. As shown, on a silicon substrate 4107, a waveguide core 4108 and a clad 4109 of the slab waveguide 4102 are formed. The groove 4106 is formed by removing a part of the waveguide core 4108 and the clad 4109 so as to divide the waveguide core 4108. In FIG. 35A and FIG. 35B, the grooves 4106 are divided into a plurality of grooves. This is because radiation loss can be reduced compared to a single groove.

In the athermal AWG 4100, wavelength multiplexed signal light input to the first input/output waveguide 4101 is demultiplexed to each waveguide of the second input/output waveguides 4105 and output as signal light for each wavelength channel. Further, the signal light for each wavelength channel input to each waveguide of the second input/output waveguides 4105 is multiplexed to the first input/output waveguide 4101 and output as wavelength multiplexed signal light. That is, the athermal AWG operates as an optical wavelength multiplexing and demultiplexing circuit.

In FIG. 35A, a length $L_i$ of an ith waveguide of the arrayed waveguides 4103 is expressed as $L_i = L_1 + (i-1) \cdot \Delta L$ and the arrayed waveguides 4103 are designed such that the waveguide length increases successively by a fixed amount $\Delta L$. In parallel with this, a total length $L_i'$ for the light wave incident to each arrayed waveguide to be disturbed by the grooves 4106 in the first slab waveguide 4102 is expressed as $L_i' = L_1' + (i-1) \cdot \Delta L'$ and the grooves are shaped so as to increase successively by an amount $\Delta L'$ in proportion to $\Delta L$. In this case, a transmission center wavelength $\lambda_c$ from the first input/output waveguide 4101 to the center waveguide of the second input/output waveguides 4105 of the AWG is expressed by the following:

$$\lambda_c = \{n_a \Delta L - n_s \Delta L' + n' \Delta L'\}/M. \quad (1)$$

where, $n_a$ is the effective refractive index of the arrayed waveguides, $n_s$ is the effective refractive index of the slab waveguides, n' is the refractive index of the temperature compensating material, and M is the diffraction order. Further, $\{n_a \Delta L - n_s \Delta L' + n' \Delta L'\}$ indicates a difference in distance between neighboring optical paths in the AWG, i.e., an optical path length difference. In this case, it is assumed that n' is close to $n_s$ and the refraction angle of a light wave in the grooves is sufficiently small. Here, the optical path length is a distance over which a light wave experiences and is found by a product of a refractive index of a material and a physical path distance.

The athermal AWG is designed to hold $\Delta L'/(\Delta L - \Delta L') = -\alpha/\alpha'$, i.e., $\Delta L' = \Delta L/(1 - \alpha'/\alpha)$ where the temperature coefficient of effective refractive index of the arrayed waveguides and the slab waveguides is $\alpha$ ($\alpha = dn_a/dT = dn_s/dT$, T is temperature) and the temperature coefficient of refractive index of the temperature compensating material is $\alpha'$ ($\alpha' = dn'/dT$). Due to this, the change with temperature in optical path length difference in the arrayed waveguides and the slab waveguides is canceled by the change with temperature in the optical path length difference of the temperature compensating material filled in the groove, and therefore, the temperature dependence at the transmission center wavelength is compensated. As the temperature compensating material, any material can be used as long as it has $\alpha'$ that satisfies the above-described conditions for the $\alpha$ of the waveguide. However, a material is preferable, for which the sign of $\alpha'$ is different from that of $\alpha$ and $|\alpha'|$ is sufficiently greater than $|\alpha|$. This is because the $\Delta L'$ can be designed to be small and the excess loss due to the grooves can be suppressed. A material of such conditions is, for example, silicone resin, which is optical resin, and $\alpha'$ is about $-35 \times \alpha$. Further, the optical resin is also preferable since it is superior in long-term reliability as an optical component material.

As another method of reducing the temperature dependence of transmission wavelength of the AWG, a method is known, in which the chip of the AWG is cut into an arc-shape along the circuit, both ends of the chip are joined by a metal rod, so that the AWG chip is deformed by thermal expansion and contraction of the metal rod, thereby cancelling the change with temperature in the optical path length difference of the neighboring arrayed waveguides. The details are disclosed in Non-Patent Literature 1 (NPL 1).

As still another method of reducing the temperature dependence of transmission wavelength of the AWG, a method is known, in which the slab waveguide on the input side or output side of the AWG chip is divided, the divided chips are joined by a metal plate, so that the relative position of the divided slab waveguides is changed by thermal expansion and contraction of the metal plate. This can cancel the change with temperature in the optical path length difference of the arrayed waveguides.

In the conventional AWG, a transmission spectrum is an integration of power overlap of the photoelectric field excited at the connection boundary between the first input/output waveguide and the first slab waveguide and the photoelectric field excited at the connection boundary between the second input/output waveguides and the second slab waveguide. Normally, in these photoelectric fields, only the fundamental mode is excited and the transmission spectrum waveform has a shape of the Gaussian function. However, a method has been developed for flattening a transmission waveform to extend the band by providing a parabolic tapered waveguide at the connection part of the first input/output waveguide to the first slab waveguide or the connection part of the second input/output waveguides to the second slab waveguide 4104. The details are disclosed in Patent Literature 3 (PTL 3).

CITATION LIST

Patent Literature

PTL 1: International Publication WO98/36299 Specification
PTL 2: Japanese Patent Publication No. 3498650
PTL 3: Japanese Patent Publication No. 3112246
PTL 4: Japanese Patent Laid-Open No. 2003-149474

Non Patent Literature

NPL 1: J. B. D. Soole, et, al., "Athermalisation of silica arrayed waveguide grating multiplexers," ELECTRONICS LETTERS, Vol. 39, pp. 1182-1184, 2003.
NPL 2: J. Leuthold, et, al., "Multimode Interference Couplers for the Conversion and Combining of Zero- and First-Order Modes", JOURNAL OF LIGHTWAVE TECHNOLOGY, Vol. 16, pp. 1228-1238, 1998.
NPL 3: I. Zhang, et, al., "Planar waveguide-based silica-polymer hybrid variable optical attenuator and its associated polymers", APPLIED OPTICS, Vol. 44, pp. 2402-2408, 2005.

SUMMARY OF INVENTION

Technical Problem

Even with the AWG athermalized as described above, the temperature dependence at the transmission center wavelength can not be compensated completely. This is because the temperature coefficient of effective refractive index of the silica glass waveguide and the temperature compensating material or the thermal expansion coefficient of the metal includes not only a first component but also a 2nd component and the ratio between the first component and the 2nd component generally differs depending on materials. In the case of the silica glass waveguide, for $\alpha = \alpha_1 + \alpha_2 T$, approximately ($\alpha_1 = 1.0 \times 10^{-5}$ and $\alpha_2 = 1.9 \times 10^{-8}$ (units of T is °C). In the case of silicone resin, for $\alpha' = \alpha'_1 + \alpha'_2 T$, approximately $\alpha'_1 = -3.5 \times 10^{-4}$ and $\alpha'_2 = 1.5 \times 10^{-7}$. The conventional athermal AWG is designed such that the primary temperature dependence is compensated at the center temperature in the operating temperature range. The secondary coefficient is very small compared to the primary coefficient. However, there remains slight temperature dependence over the entire operating temperature range.

As an example, it is described with the athermal AWG in FIG. 35A. It assumes that relative refractive index difference (Δ) of the waveguide is 1.5%, the core thickness is 4.5 μm, the core width of the first input/output waveguide 4101, the arrayed waveguides 4103, and the second input/output waveguides 4105 is 4.5 μm, the number of wavelength channels is 32, the channel wavelength interval is 0.8 nm (100 GHz), and the temperature compensating material is silicone resin. In this case, the number of arrayed waveguides is 130 and ΔL is 42.4 μm.

The path length difference ΔL' to be given by the temperature compensating material filled in the grooves 4106 is $\Delta L' = \Delta L/(1-\alpha'/\alpha) = \Delta L/(1-(\alpha'_1+\alpha'_2 T)/(\alpha_1+\alpha_2 T))$. Assuming that the operating temperature range is T=−40 to 80° C. and considering the condition of T=20° C. at the center, ΔL'=1.18 μm.

FIG. 36 shows the relative temperature dependence at the transmission center wavelength at the center wavelength channel of the athermal AWG. As can be seen from the figure, a very small variation in wavelength remains in the shape of a quadratic function with a minimum at T=20° C. In the operating temperature range T=−40 to 80° C., the width of wavelength variation is 0.07 nm, reaching 9% of the wavelength channel interval.

As such, in the athermal AWG according to the conventional art, the temperature dependence at the transmission center wavelength remains slightly. Because of this, it is a problem that the performance required for a transmission system cannot be met in some cases in an optical wavelength multiplexing and demultiplexing circuit having a narrow wavelength channel interval for which accuracy of the transmission center wavelength is required, or having a wide operating temperature range.

The present invention has been made in view of such a problem and an object thereof is to provide an optical wavelength multiplexing and demultiplexing circuit in which the change with temperature of the transmission center wavelength remained in an athermal AWG has been compensated.

Solution to Problem

In order to achieve such an object, an arrayed waveguide grating according to an embodiment of the present invention comprises a first slab waveguide, arrayed waveguides and a second slab waveguide, wherein the main temperature dependence at the transmission center wavelength has been compensated, is characterized by comprising a first input/output waveguide, an optical splitter connected to the first input/output waveguide, a first and a second arm waveguides connected to the optical splitter, an optical mode combining coupler connected to the first and second arm waveguides and coupling fundamental mode light from the first arm waveguide as fundamental mode and coupling fundamental mode light from the second arm waveguide as first mode, and a mechanism for changing an optical path length difference between the first and second arm waveguides with temperature and configured to compensate for the temperature dependence remained in the arrayed waveguide grating.

The arrayed waveguide grating according to an embodiment of the present invention is characterized by further comprising a multimode waveguide connected to the optical mode combining coupler, capable of propagating at least fundamental and first mode light and connected to the first slab waveguide.

The arrayed waveguide grating according to an embodiment of the present invention is characterized in that the mechanism is a groove formed in at least one of the first and second arm waveguides and filled with a temperature compensating material.

The arrayed waveguide grating according to an embodiment of the present invention is characterized in that the groove is composed of a plurality of grooves.

The arrayed waveguide grating according to an embodiment of the present invention is characterized in that the mechanism is a groove formed in the vicinity of at least one of the first and second arm waveguides and filled with a temperature compensating material.

The arrayed waveguide grating according to an embodiment of the present invention is characterized in that the waveguide is made of silica based glass and the temperature compensating material is an optical resin including at least one of silicone resin, epoxy resin and fluorine resin.

The arrayed waveguide grating according to an embodiment of the present invention is characterized in that the multimode waveguide is connected to the first slab waveguide via a tapered waveguide.

The arrayed waveguide grating according to an embodiment of the present invention is characterized in that the multimode waveguide is connected to the first slab waveguide via a parabolic tapered waveguide.

The arrayed waveguide grating according to an embodiment of the present invention is characterized by further comprising a second input/output waveguide connected to the second slab waveguide, wherein the second input/output waveguide is connected to a second slab waveguide via a parabolic tapered waveguide.

The arrayed waveguide grating according to an embodiment of the present invention is characterized in that the optical splitter is configured as a wavelength insensitive coupler.

The arrayed waveguide grating according to an embodiment of the present invention is characterized in that a light intensity branching ratio of the optical splitter to the first arm waveguide is less than 50% and the groove is formed only in the first arm waveguide.

The arrayed waveguide grating according to an embodiment of the present invention is characterized in that a light intensity branching ratio of the optical splitter to the first arm waveguide is less than 20%.

The arrayed waveguide grating according to an embodiment of the present invention is characterized in that the optical mode combining coupler is a directional coupler comprising two waveguides with different widths.

The arrayed waveguide grating according to an embodiment of the present invention is characterized in that a width of a narrower waveguide of the directional coupler gradually decreases.

The arrayed waveguide grating according to an embodiment of the present invention is characterized in that the directional coupler further comprises a groove for terminating a narrower waveguide, wherein the groove is filled with a light-blocking material for attenuating light.

The arrayed waveguide grating according to an embodiment of the present invention is characterized in that the optical mode combining coupler comprises two multimode interference couplers coupled in a cascade.

The arrayed waveguide grating according to an embodiment of the present invention is characterized in that the arrayed waveguide grating is compensated for the main temperature dependence at the transmission center wavelength by a groove formed in at least one of the first slab waveguide, the arrayed waveguide and the second slab waveguide, and filled with a temperature compensating material.

The arrayed waveguide grating according to an embodiment of the present invention is characterized in that the temperature compensating material is an optical resin including at least one of silicone resin, epoxy resin and fluorine resin.

The arrayed waveguide grating according to an embodiment of the present invention is characterized in that the arrayed waveguide grating is compensated for the main temperature dependence at the transmission center wavelength by deforming a shape of a metal plate by thermal expansion and contraction.

The arrayed waveguide grating according to an embodiment of the present invention is characterized in that the arrayed waveguide grating is compensated for the main temperature dependence at the transmission center wavelength by dividing the first slab waveguide or the second slab waveguide and changing their relative positions by thermal expansion and contraction of a metal plate.

Advantageous Effects of Invention

According to the present invention, the high-order temperature dependence at the transmission center wavelength can be compensated, which remains in the athermal AWG type optical wavelength multiplexing and demultiplexing circuit. Hence, a wavelength multiplexing and demultiplexing circuit can be realized, which is superior in an accuracy of the transmission center wavelength over the entire operating temperature range. Further, an optical wavelength multiplexing and demultiplexing circuit can be obtained, having a wide operating temperature range for an accuracy of the transmission center wavelength.

DESCRIPTION OF EMBODIMENTS

In a conventional athermal AWG, normally, only the fundamental mode light propagates in a first input/output waveguide and the position of the light intensity peak in the optical field excited at the connection part of a first slab waveguide does not change with temperature or wavelength. When first mode light is mixed in a specific intensity ratio in the optical field described above, the position of the light intensity peak in the optical field vibrates depending on the phase difference between the fundamental mode light and the first mode light, and the amplitude of the vibration changes depending on the light intensity ratio between light in both modes.

On the other hand, the variation in the position of the light intensity peak in the optical field at the connection part of the first input/output waveguide and the first slab waveguide translates to the variation in the transmission center wavelength of the AWG. Consequently, if the first mode light is excited in a predetermined intensity ratio and the phase difference between the first mode light and the fundamental mode light can be changed by temperature but not by wavelength, using an appropriate mechanism in the first input/output waveguide, the transmission center wavelength can be varied by temperature. In the present invention, the high-order temperature dependence of the athermal AWG is compensated using this variation.

Figure 1:
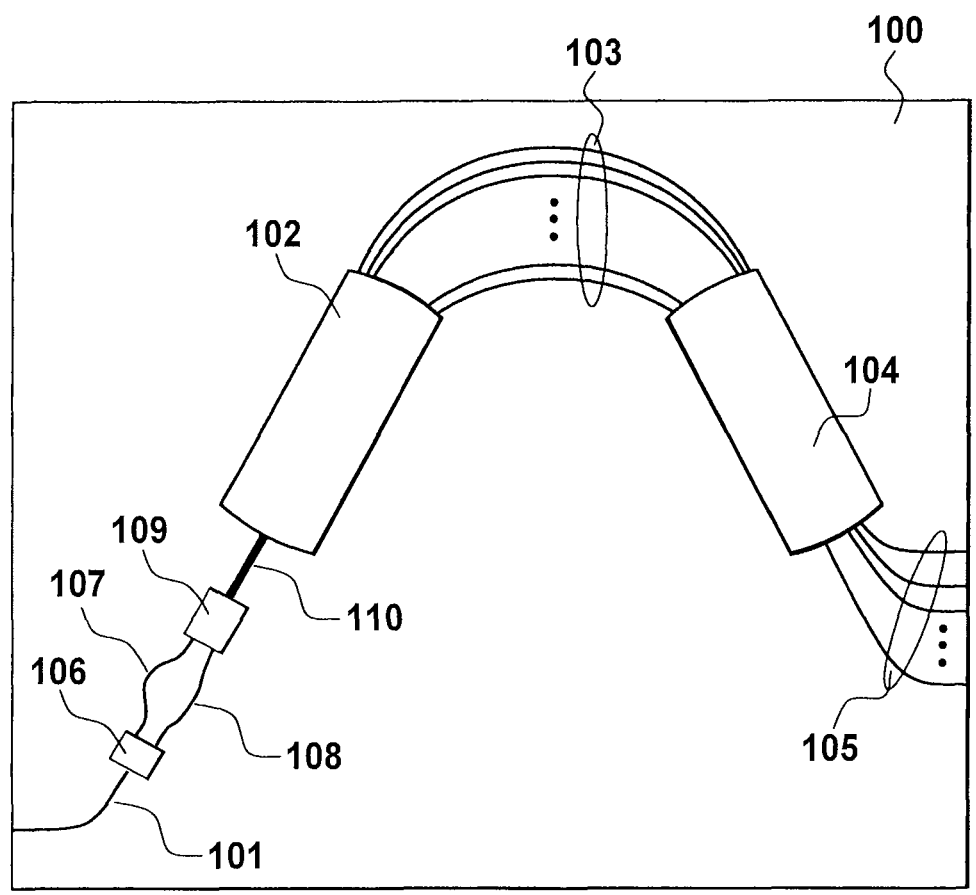
FIG. 1 is a diagram for explaining a structural concept of an arrayed waveguide grating according to an embodiment of the present invention.

Embodiments of the present invention are specifically explained below. FIG. 1 is a diagram for explaining a structural concept of an arrayed waveguide grating (optical wavelength multiplexing and demultiplexing circuit) according to an embodiment of the present invention. This AWG 100 comprises a first input/output waveguide 101, a first slab waveguide 102, arrayed waveguides 103, a second slab waveguide 104 and second input/output waveguides 105. The structure from the first slab waveguide 102 to the second input/output waveguides 105 is the same as that of the athermal AWG according to the conventional art and it is assumed that the primary temperature dependence at the transmission center wavelength is compensated by conventional temperature compensating means (not shown). The AWG 100 further comprises an optical splitter 106, a first arm waveguide 107, a second arm waveguide 108, an optical mode combining coupler 109 and a multimode waveguide 110 between the first input/output waveguide 101 and the first slab waveguide 102.

Figure 2:
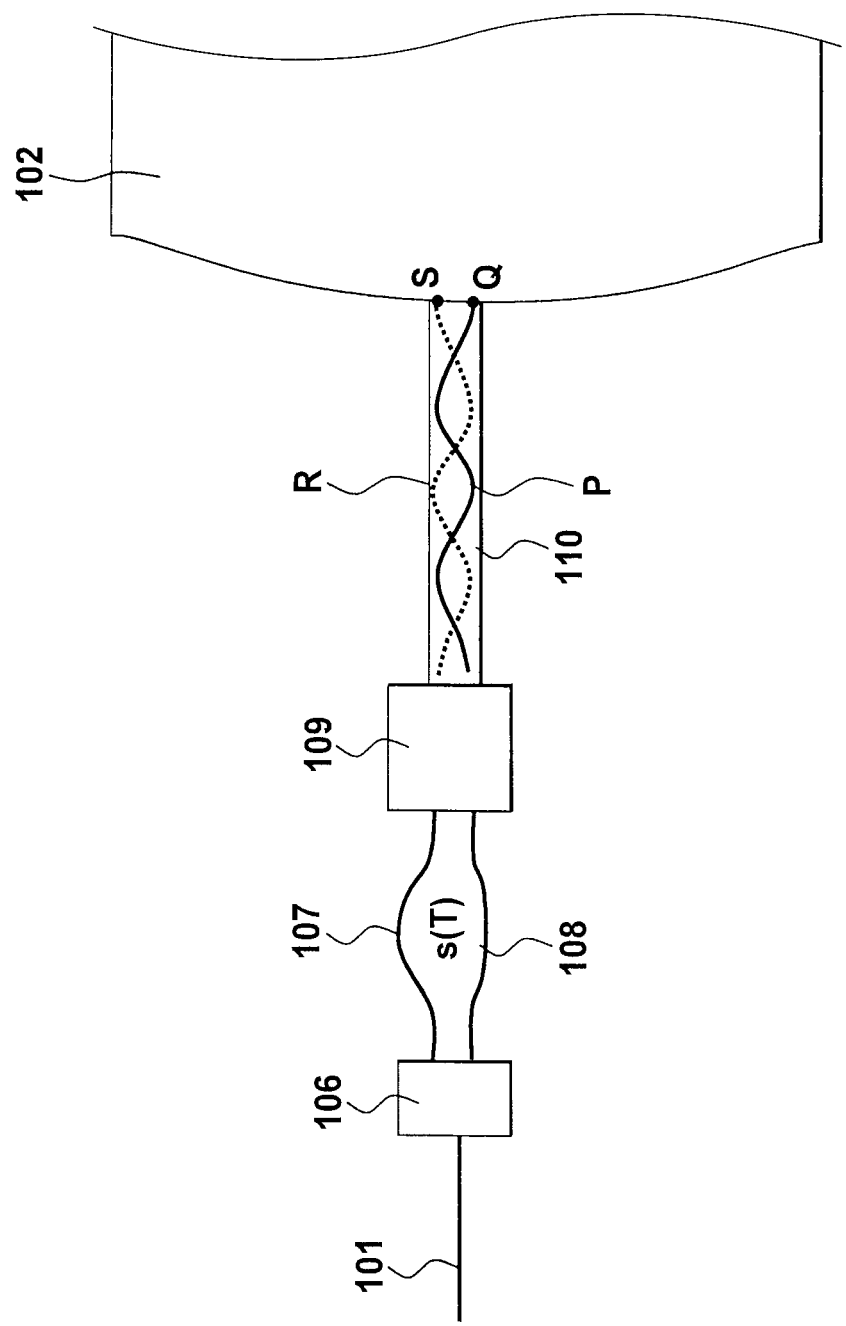
FIG. 2 is an enlarged view of a portion from an optical splitter to a multimode waveguide in FIG. 1.

FIG. 2 is an enlarged view of a portion from the optical splitter 106 to the multimode waveguide 110 in FIG. 1. Reference numerals are the same as those in FIG. 1. The optical mode coupler 109 converts the fundamental mode light incident from the first arm waveguide 107 into the first mode light and combines the fundamental mode light incident from the second arm waveguide 108 as the fundamental mode light. The light intensity ratio between the fundamental mode light and the first mode light to be combined is determined by the branching ratio at the optical splitter 106 and the coupling rate of the optical mode combining coupler, and the phase difference is determined by the optical path length difference between the first arm waveguide 107 and the second arm waveguide 108. The combined fundamental mode light and the first mode light propagate through the multimode waveguide 110 according to the effective refractive indexes of the respective modes, and therefore, the combined optical field propagates in a meandering manner and reaches the connection part with the first slab waveguide.

In the embodiment of the present invention, let a operating temperature T of the optical wavelength multiplexing and demultiplexing circuit be in a range between $T_c-\Delta T$ and $T_c+\Delta T$. $T_c$ is the center temperature in the operating temperature range and the full width of the temperature range is $2\Delta T$. Let the optical path length difference of the first arm waveguide 107 with respect to the second arm waveguide 108 be s(T). In the optical wavelength multiplexing and demultiplexing circuit of the present invention, a change with temperature is given to s(T) by an appropriate mechanism.

Figure 3:
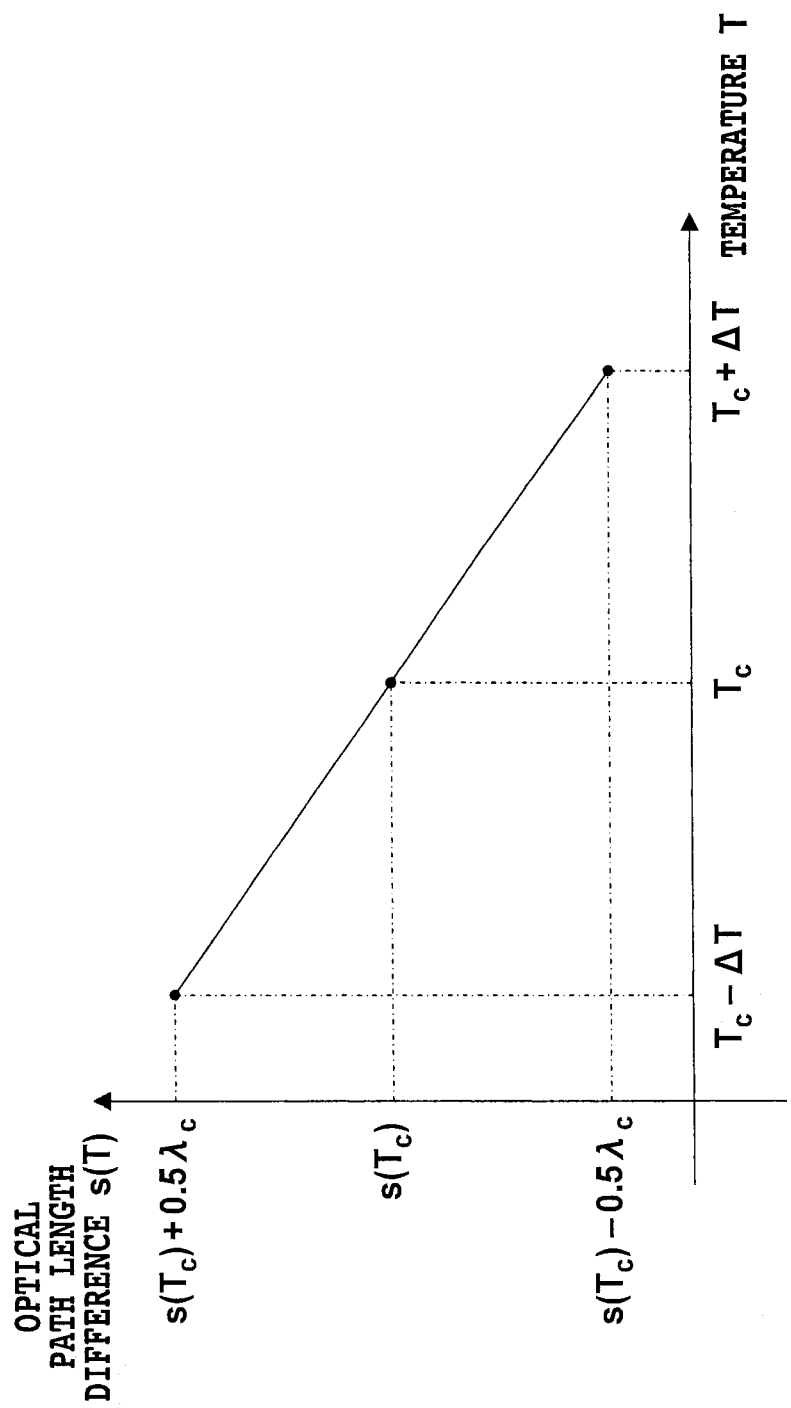
FIG. 3 is a diagram showing an example of a change with temperature in s(T) shown in FIG. 2.

FIG. 3 shows an example of a change with temperature in s(T) with respect to the temperature T. As show, s(T) is changed linearly from $s(T_c)+0.5\lambda_c$ to $s(T_c)-0.5\lambda_c$ in the operating temperature range, where $\lambda_c$ is the transmission center wavelength of the AWG in the expression (1). The length of the multimode waveguide 110 is set such that the light intensity peak in the optical field propagating in an meandering manner appears on the rightmost side toward the traveling direction of the light wave at the connection point with the first slab waveguide 102 when the temperature $T=T_c$. The locus of the light intensity peak in the optical field at the temperature $T=T_c$ is indicated as a curve P in FIG. 2 and the incident position to the first slab waveguide 102 is indicated by a point Q.

When the temperature changes from $T_c$, the optical path length difference s(T) changes as shown in FIG. 3, and at $T=T_c-\Delta T$ and $T_c+\Delta T$, it changes to $s(T_c)+0.5\lambda_c$ and $s(T_c)-0.5\lambda_c$, respectively. In this case, the phase difference between the fundamental mode light and the first mode light combined in the optical mode coupler 109 varies by 180 degrees compared to that when $T=T_c$. Thus, the locus of the light intensity peak in the optical field propagating in a meandering manner through the multimode waveguide 110 is in the opposite phase as that when $T=T_c$ as indicated by a line R in FIG. 2, and at the connection point with the first slab waveguide 102, the peak is located on the leftmost side toward the traveling direction of the light wave. This is indicated as a point S in FIG. 2.

As such, the variation in the light intensity peak according to the change with temperature in the optical field incident to the first slab waveguide 102 translates to the variation in the transmission center wavelength in the AWG. In the case of the above-described variation, when $T=T_c$, i.e., when the peak is at the point Q, the transmission center wavelength is the longest wavelength, and when $T=T_c-\Delta T$ and $T_c+\Delta T$, i.e., when the peak is at the point S, it is the shortest wavelength.

Figure 4:
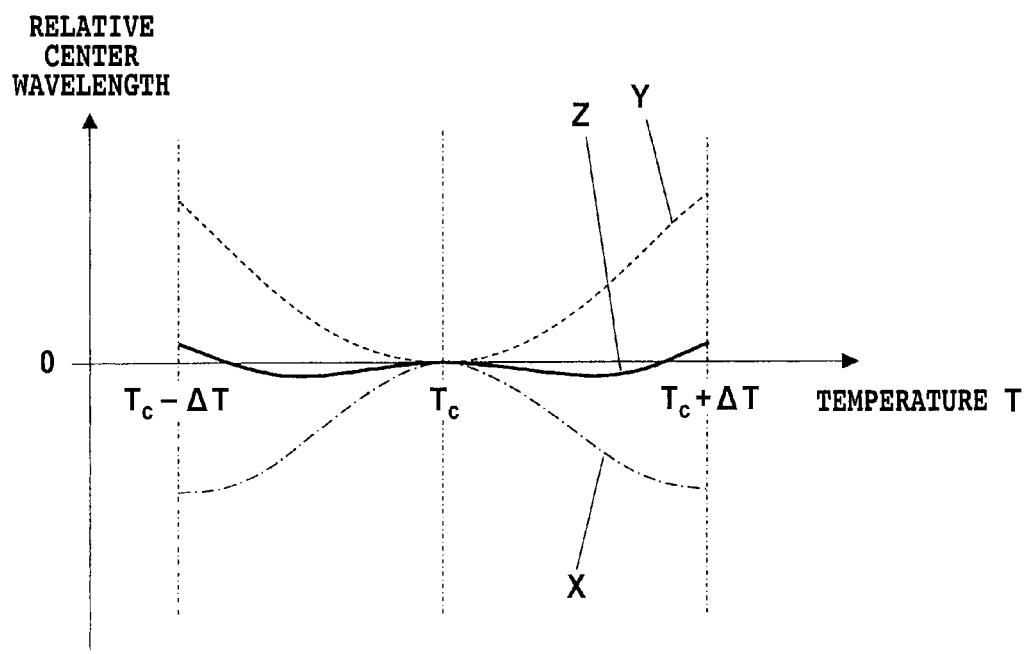
FIG. 4 is a diagram for explaining a variation with temperature in the transmission center wavelength in an AWG.

FIG. 4 is a diagram in representing the variation with temperature in the transmission center wavelength of the AWG with temperature as the horizontal axis. A line X indicates the variation in the transmission center wavelength by the variation in the peak position of the optical field explained in FIG. 2 and FIG. 3, of which behavior is like a sinusoidal function. A line Y indicates the high-order temperature dependence at the transmission center wavelength remained slightly in the athermal AWG by the conventional art. These indicate the relative transmission center wavelength as a zero value when the temperature $T=T_c$.

In the optical wavelength multiplexing and demultiplexing circuit of the present invention, the temperature dependence at the transmission center wavelength of the whole AWG circuit is the sum of the above-described two types of temperature dependence. The temperature dependence of the combined transmission center wavelength is indicated as a line Z. From the figure, it can be seen that the high-order temperature dependence at the transmission center wavelength remained in the athermal AWG by the conventional art is compensated, and the variation in the transmission center wavelength in the operating temperature range is reduced.

The width (amplitude) $\delta\lambda$ of the variation in the transmission wavelength by the variation in the position of the light intensity peak in the optical field is determined by the intensity ratio of the first mode light generated in the optical mode combining coupler 109 to the fundamental mode light. Thus, the temperature dependence at the transmission center wavelength in the wavelength multiplexing and demultiplexing circuit of the present invention can be suppressed optimally by adjusting the branching ratio of the optical splitter 106 and the coupling rate of the optical mode combining coupler 109 so as to make $\delta\lambda$ equal to the width of the high-order variation with temperature in the transmission center wavelength of the athermal AWG by the conventional art.

Figure 5:
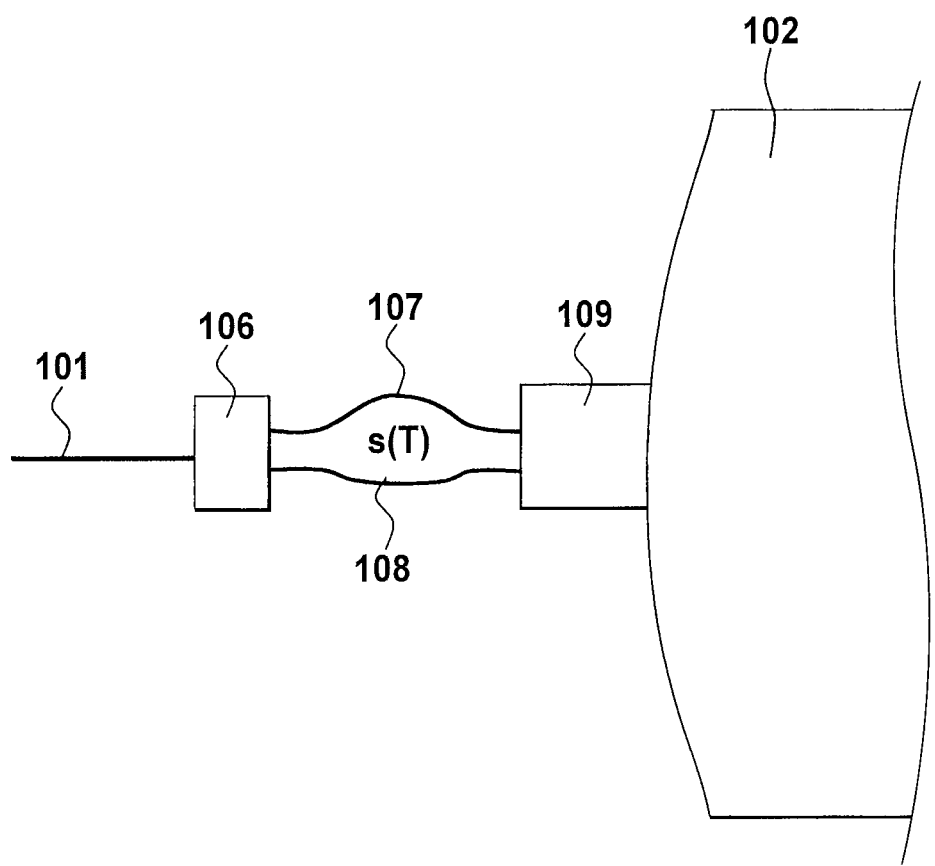
FIG. 5 is a diagram showing a configuration example in which a multimode waveguide is not used.

Preferably, the width of the multimode waveguide 110 is wide enough to be capable of propagating at least up to the first mode light, but a width not propagating the 2nd mode light, that is, a width with which the effective refractive index in the 2nd mode does not exist. This is because, the occurrence of the 2nd or higher-order mode light has a possibility of distorting the transmission waveform and inducing a deteriorated crosstalk and an increased loss in the wavelength multiplexing and demultiplexing circuit of the present invention. Note that the multimode waveguide 110 is not necessarily required to present in practical use. It may be configured to directly connect the optical mode combining coupler 109 to the first slab waveguide 102 as shown in FIG. 5. However, by arranging the multimode waveguide 110, the 2nd or higher-order mode light can be suppressed preventing it from entering into the first slab waveguide 102, and therefore, a superior optical wavelength multiplexing and demultiplexing circuit in crosstalk or the loss characteristics can be realized.

Considering the wavelength dependence of the variation in the position of the light intensity peak in the optical field, $s(T_c)$ is preferably designed to be near zero. This is because, by suppressing the optical path length difference s(T) small in the operating temperature range, the change in s(T) by wavelength becomes sufficiently small compared to that with temperature, resulting in substantially wavelength insensitive. More specifically, if the absolute value of $s(T_c)$ is suppressed to 10 times $\lambda_c$ or less, the change in optical path length difference in a communication wavelength region of about 1520 to 1630 nm becomes ignorable with respect to the change with temperature, and the wavelength multiplexing and demultiplexing circuit of the present invention operates substantially in a similar manner in all the wavelength channels for multiplexing and demultiplexing.

The structure of the optical wavelength multiplexing and demultiplexing circuit of the present invention is similar to the arrayed waveguide type wavelength multiplexer/demultiplexer described in Patent Literature 4. However, the arrayed waveguide type wavelength multiplexer/demultiplexer described in Patent Literature 4 differs from the optical wavelength multiplexing and demultiplexing circuit of the present invention in that the position of the field incident to the first slab waveguide of the AWG varies in the same repetitive wavelength cycle as that of the channel wavelength interval of the AWG. In the present invention, the position of the field incident to the first slab waveguide of the AWG is required to hardly vary with respect to the wavelength at a certain temperature. That is, it is indispensable for an interference circuit including the optical splitter, the two arm waveguides and the optical mode combining coupler to hardly vary in the optical path length difference with respect to wavelength. In the optical wavelength multiplexing and demultiplexing circuit of the present invention, when the position of the field incident to the first slab waveguide varies by the change in wavelength over about the operating wavelength region, the temperature dependence of the optical path length difference exhibits different characteristics depending on wavelength, and therefore, it is impossible to realize the positional variation of the field so as to compensate for the residual wavelength dependence of the AWG over all the operating wavelengths. Hence, the structure of the arrayed waveguide type wavelength multiplexer/demultiplexer described in Patent Literature 4 impedes the solution to the problem by the present invention.

(First Embodiment)

Figure 6:
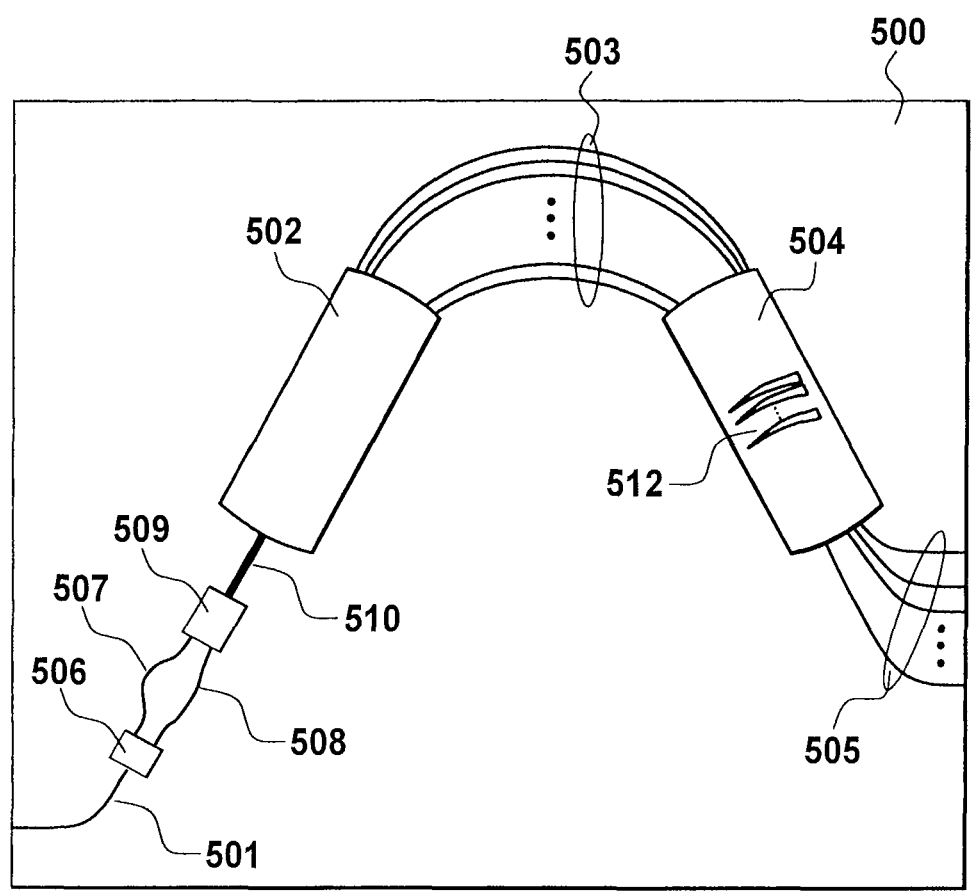
FIG. 6 is a diagram showing a configuration example of an athermal AWG according to a first embodiment of the present invention.

FIG. 6 shows a configuration example of an athermal AWG according to a first embodiment of the present invention. The athermal AWG 500 comprises a first input/output waveguide 501, a first slab waveguide 502, arrayed waveguides 503, a second slab waveguide 504 and second input/output waveguides 505. Further, the athermal AWG 500 comprises an optical splitter 506, a first arm waveguide 507, a second arm waveguide 508, an optical mode combining coupler 509 and a multimode waveguide 510 between the first input/output waveguide 501 and the first slab waveguide 502. In the second slab waveguide 504, grooves 512 are formed and the groove 512 is filled with a temperature compensating material.

In FIG. 6, a length $L_i$ of an ith waveguide of the arrayed waveguides 503 is expressed as $L_i=L_1+(i-1)\cdot \Delta L$ and designed so as to increase successively by a fixed amount $\Delta L$. In parallel with this, a length $L_i'$ for the light wave, which passes through respective arrayed waveguides and passes through the center wavelength channel, to be disturbed by the grooves 512 in the second slab waveguide 504 is expressed by $L_i'=L_1'+(i-1)\Delta L'$, and the grooves are shaped to increase successively by an amount $\Delta L'$ in proportion to $\Delta L$. In this athermal AWG, the relative refractive index difference $\Delta$ of the waveguide is 1.5%, the core thickness is 4.5 µm, and the temperature coefficient of effective refractive index $\alpha=1.0\times 10^{-5}+1.9\times 10^{-8}\times T$. The core width of the first input/output waveguide 501, the arrayed waveguides 503, the second input/output waveguides 505, the first arm waveguide 507 and the second arm waveguide 508 is 4.5 µm. The number of wavelength channels is 32, the transmission wavelength of the center wavelength channel is 1,544.53 nm (194.1 THz), the wavelength channel interval is 0.8 nm (100 GHz), and the temperature compensating material is silicone resin (temperature coefficient of refractive index $\alpha'=-3.5\times 10^{-4}+1.5\times 10^{-7}\times T$). In this case, the number of arrayed waveguides is 130 and $\Delta L$ is 42.4 µm.

The path length difference $\Delta L'$ given by the temperature compensating material filled in the grooves 512 is designed to be $\Delta L'=\Delta L/(1-\alpha'/\alpha)=1.18$ µm assuming T=20° C., thereby the primary temperature dependence at the transmission center wavelength is compensated. Further, the length of the first slab waveguide 502 and the second slab waveguide 504 is 6,100 µm and the second input/output waveguides 505 are arranged as many as the number of the wavelength channels, i.e., 32, at intervals of 15 µm on the connected part to the second slab waveguide 504.

Figure 7:
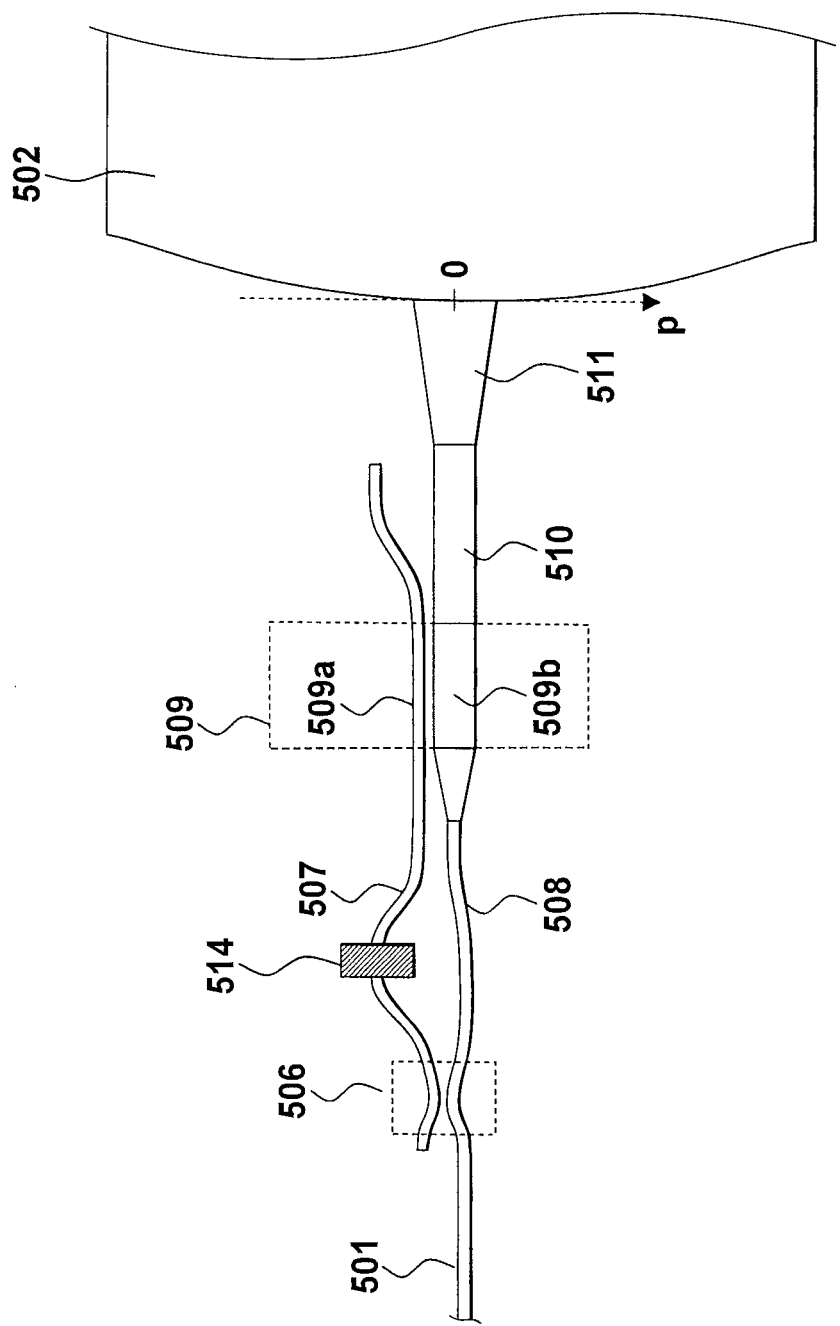
FIG. 7 is an enlarged view of a portion from an optical splitter to a multimode waveguide in FIG. 6.

FIG. 7 is an enlarged view of a portion from the optical splitter 506 to the multimode waveguide 510 in the athermal AWG in FIG. 6. Reference numerals are the same as those in FIG. 6. However, in the present embodiment, the multimode waveguide 510 is connected to the first slab waveguide 502 via a linearly tapered waveguide 511. The waveguide width of the multimode waveguide 510 is 8 µm and the waveguide width of the linearly tapered waveguide 511 is 11.5 µm at the connection part with the first slab waveguide 502. However, the transmission bandwidth of the optical wavelength multiplexing and demultiplexing circuit can be adjusted by varying the opening width of the linearly tapered waveguide.

As the optical splitter 506, a directional coupler is used. As the optical mode combining coupler 509, a directional coupler having an asymmetric waveguide width is used and the width of a waveguide 509a connected to the first arm waveguide 507 is set to 2.5 µm, the width of a waveguide 509b connected to the second arm waveguide 508 is set to 8 µm, and the length of the waveguides 509a, 509b is set to 500 µm. The waveguide width from the second arm waveguide 508 to the waveguide 509b is smoothly converted by a linear taper.

In this case, the fundamental mode effective refractive index of the waveguide 509a is substantially equal to the first mode effective refractive index of the waveguide 509b and the fundamental mode light incident from the first arm waveguide 507 to the waveguide 509a is coupled with the first mode of the waveguide 509b. The fundamental mode light incident from the second arm waveguide 508 propagates through the waveguide 509b remained in the fundamental mode, and therefore, the fundamental mode and the first mode are combined and output to the multimode waveguide 510. The phase difference between the fundamental mode light and the first mode light is determined by the optical path length difference of the first arm waveguide 507 with respect to the second arm waveguide 508.

As a mechanism of giving temperature dependence to the above-mentioned optical path length difference, a groove 514 is formed in the middle of the first arm waveguide 507 and is filled with silicone resin, a temperature compensating material. The mechanism with this configuration is superior in that it can be manufactured without changing any process of the conventional athermal AWG or without adding new materials. The length of the first arm waveguide 507 disturbed by the groove 514 is 35 µm. The light intensity ratio between the fundamental mode light and the first mode light is determined by the branching ratio of the optical splitter 506 and the coupling rate of the optical mode combining coupler 509 from the waveguide 509a to the waveguide 509b, and in the present embodiment, they are designed to be 7% and 70%, respectively. In the groove 514, loss of light occurs, and therefore, considering the loss characteristics of the whole athermal AWG circuit, it is preferable to design the branching ratio to the first arm waveguide 507 in the optical splitter 506 to be 50% at most, and it is further preferable to set it as small as possible in a range of required variation for the peak position in the optical field. None-converted light from the fundamental mode into the first mode in the optical mode combining coupler 509 becomes a loss, and therefore, it is preferable to set the coupling rate of the optical mode combining coupler 509 as large as possible. At the same time, if the ratio of the first mode light to the fundamental mode light is too large, the deformation of the field waveform along with the variation in the peak position occurs in the optical field, and therefore, deviation in the transmission waveform of the AWG may occur. In this sense, the ratio of the first mode light to the fundamental mode light is preferred to be about ¼ or less, and thus the branching ratio to the first arm waveguide 507 in the optical splitter 506 is preferred to be 20% at most.

Figure 8A:
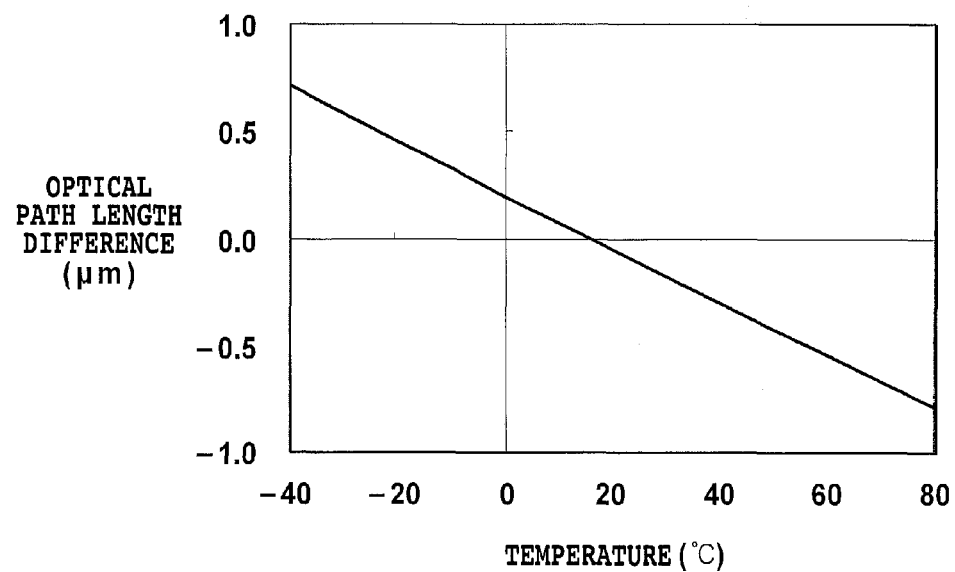
FIG. 8A is a graph showing a change with temperature in the optical path length difference of a first arm waveguide with respect to a second arm waveguide in the first embodiment of the present invention.

FIG. 8A is a graph showing a change with temperature in the optical path length difference of the first arm waveguide 507 with respect to the second arm waveguide 508. In the figure, the operating temperature range is set to be −40 to 80° C. In this operating temperature range, the optical path length difference changes almost linearly from +0.77 µm to −0.77 µm. Consequently, the phase difference between the fundamental mode light and the first light mode generated in the optical mode combining coupler 509 changes by 2π.

Figure 8B:
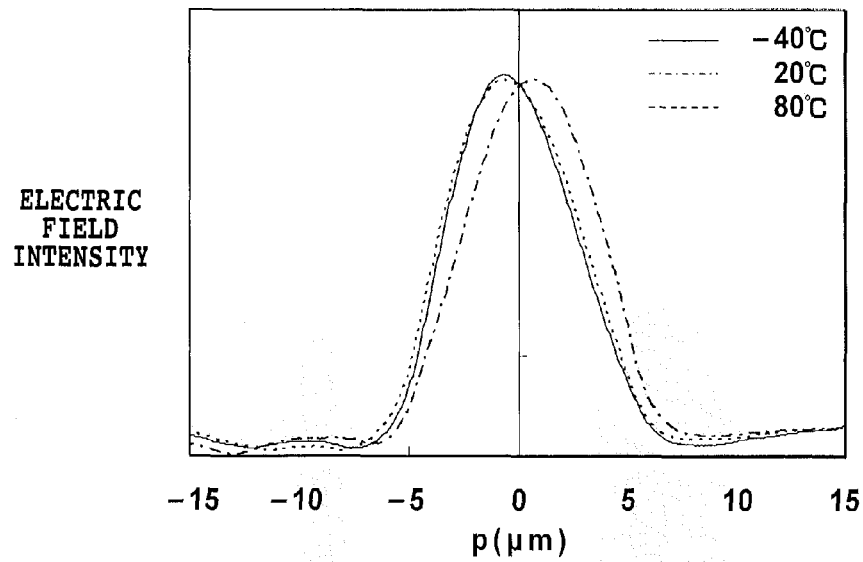
FIG. 8B is a graph showing a change with temperature in the optical field distribution at a connection part of a linear taper with a first slab waveguide for a change in the optical path length difference in FIG. 8A.

FIG. 8B is a graph showing a change with temperature in the optical field distribution at the connection part of the linear taper 511 with the first slab waveguide 502 for the change in optical path length difference in FIG. 8A. A horizontal axis p in the graph, as shown in FIG. 7, is the relative position with the center of the linear taper 511 as the origin. In FIG. 8B, the optical field distribution at temperatures −40, 20 and 80° C. is shown. It can be confirmed that along with the change in phase difference between the fundamental mode light and the first mode light in the operating temperature range, the peak position in the optical field changes from about −0.6 µm to +0.6 µm and further changes up to −0.6 µm.

Figure 9:
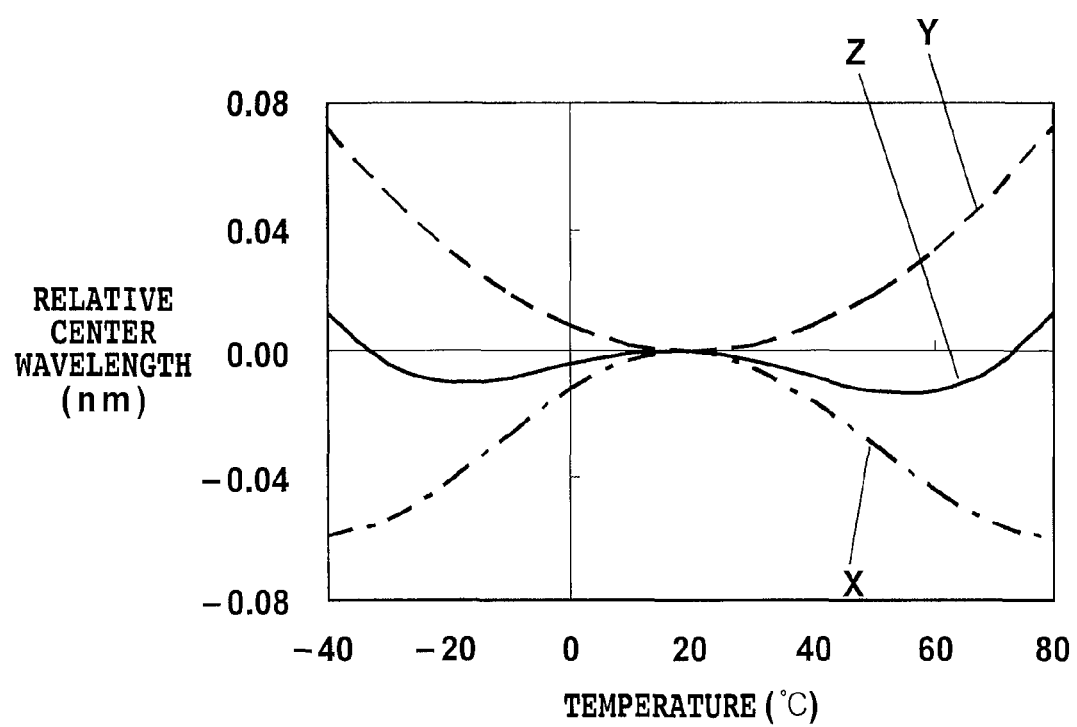
FIG. 9 is a diagram for explaining a variation with temperature in the transmission center wavelength in the first embodiment of the present invention.

FIG. 9 is a graph for explaining the variation with temperature in the transmission center wavelength in the optical wavelength multiplexing and demultiplexing circuit of the present embodiment. The line X indicates the variation in the transmission center wavelength due to the variation in the peak position in the optical field at the connection part of the linear taper 511 with the first slab waveguide 502. The line Y indicates the high-order temperature dependence at the transmission center wavelength remained in the AWG in which the primary temperature dependence from the first slab waveguide 502 to the second input/output waveguide 505 has been compensated. In this optical wavelength multiplexing and demultiplexing circuit, the temperature dependence at the transmission center wavelength for the whole AWG circuit is the sum of the above-described two types of temperature dependences. The combined temperature dependence at the transmission center wavelength is indicated as the line Z. From the figure, it can be seen that in the optical wavelength multiplexing and demultiplexing circuit of the present embodiment, the high-order variation with temperature in the transmission center wavelength remained as 0.072 nm in the range of −40 to 80° C. in the athermal AWG by the conventional art is compensated and the variation is reduced to as small as 0.025 nm.

It is demonstrated in FIG. 9 that in the optical wavelength multiplexing and demultiplexing circuit of the present embodiment, the variation with temperature in the transmission center wavelength is small compared to that in the athermal AWG according to the conventional art. However, in FIG. 9, the temperature dependence at the transmission center wavelength is not compensated completely. This is because while the high-order temperature dependence at the transmission center wavelength in the athermal AWG according to the conventional art is like a quadratic function (line Y), the variation with temperature in the transmission center wavelength due to the variation in the peak position in the optical field for canceling the former is like a sinusoidal function (line X), and there is a difference between the two curves. In the following, a method is described to reduce the incomplete compensation due to the curve difference as much as possible.

This method does not use the entire variation in one cycle (phase 2π), but uses only a part thereof in the sinusoidal variation with temperature used for compensation. Consequently, the variation curve with temperature used for compensation becomes closer to the quadratic function curve to be compensated and the accuracy of compensation is improved. However, it is necessary to adjust the variation amplitude with temperature by design.

This is specifically described with reference to FIG. 10 and FIG. 11. In this method, in order to adjust the variation amplitude with temperature, the light intensity ratio of the first mode to the fundamental mode propagating through the multimode waveguide 510 is somewhat increased. In this case, the coupling rate in the optical splitter 506 is set to 11%, which is about 1.5 times. Further, the length of the first arm waveguide 507 disturbed by the groove 514 is set to 23 µm, which is about ⅔.

Figure 10:
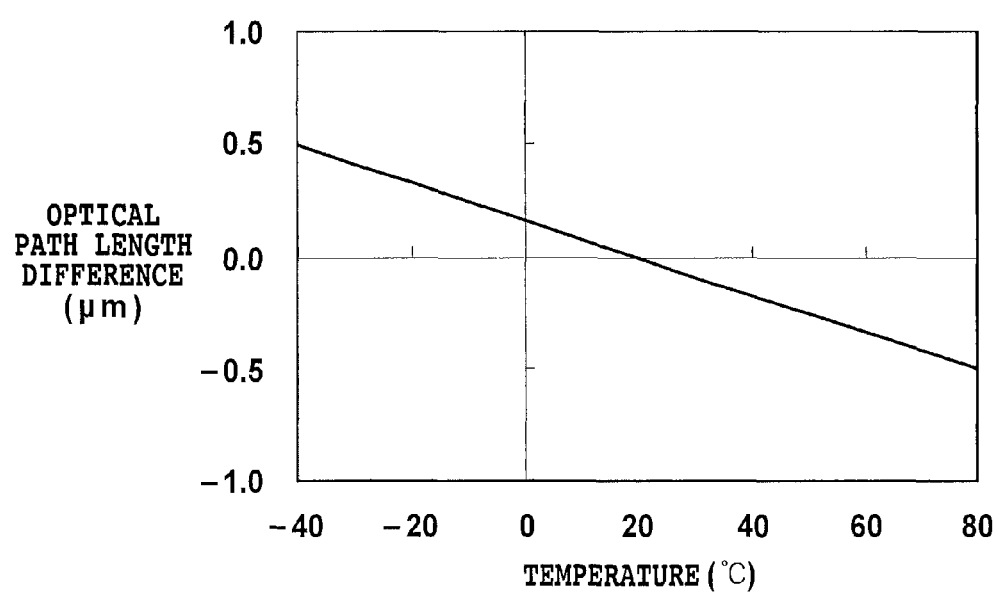
FIG. 10 is a graph showing a change with temperature in the optical path length difference of the first arm waveguide with respect to the second arm waveguide for enabling further compensation of the temperature characteristics.

FIG. 10 is a graph showing the change with temperature in the optical path length difference of the first arm waveguide 507 with respect to the second arm waveguide 508 in this method. The operating temperature range of the optical wavelength multiplexing and demultiplexing circuit is set to −40 to 80° C., which is the same as in the examples in FIG. 8A and FIG. 8B. In this operating temperature range, the optical path length difference changes from +0.50 µm to −0.50 µm. Consequently, the phase difference between the fundamental mode light and the first mode light generated in the optical mode combining coupler 509 will change by 1.3π. This is about ⅔ of the phase change in FIG. 8A and FIG. 8B.

Figure 11:
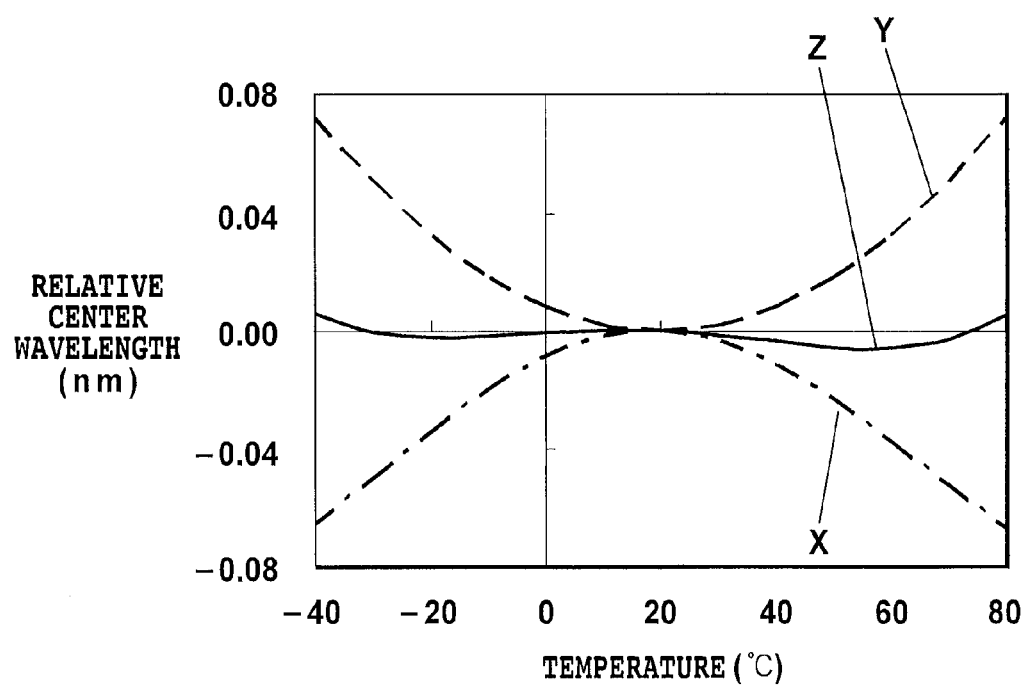
FIG. 11 is a diagram for explaining a variation with temperature in the transmission center wavelength for the optical path length difference in FIG. 10.

FIG. 11 is a graph for explaining the variation with temperature in the transmission center wavelength when the optical path length difference in FIG. 10 is given. As in FIG. 9, the line X indicates the variation with temperature in the transmission center wavelength due to the variation in the peak position in the optical field. The line Y indicates the high-order temperature dependence at the transmission center wavelength remained in the AWG in which the primary temperature dependence has been compensated. From the figure, it can be seen that the curve of the line X is similar to the curve of the line Y, compared to the case in FIG. 9. The temperature dependence at the transmission center wavelength for the whole AWG circuit is indicated as the line Z. In this optical wavelength multiplexing and demultiplexing circuit, the variation with temperature in the transmission center wavelength in the range of −40 to 80° C. is 0.011 nm, and it can be seen that the high-order variation with temperature in the transmission center wavelength remained in the athermal AWG by the conventional art is compensated almost completely.

In the present embodiment, as shown in FIG. 7, the groove 514 is formed so as to divide the first arm waveguide 507 and filled with a temperature compensating material. However, the shape and arrangement of the groove are not limited to this configuration.

Figure 12A:
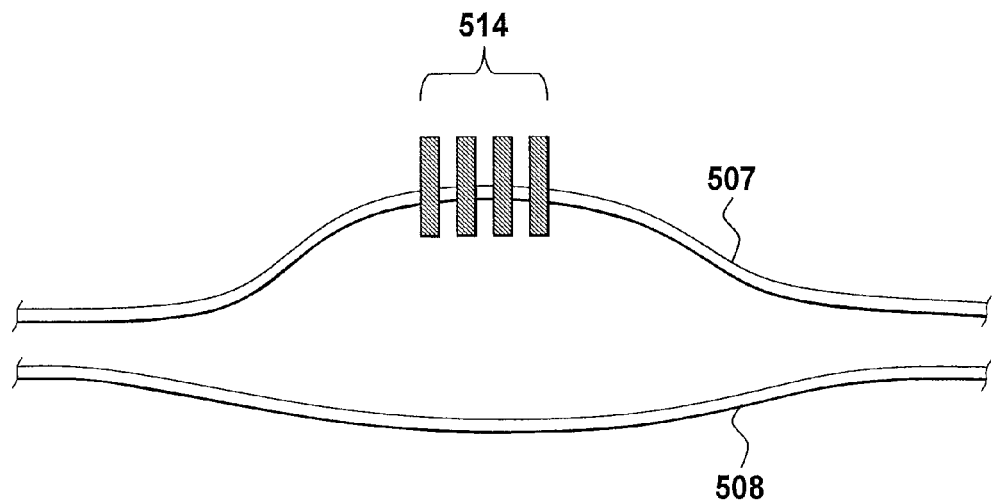
FIG. 12A is a diagram showing another configuration example of the first arm waveguide and the second arm waveguide.

FIG. 12A is an enlarged view of the vicinity of the first arm waveguide 507 and the second arm waveguide 508 in another configuration. In the configuration of FIG. 12A, the groove 514 is divided into four pieces and formed in the middle of the first arm waveguide 507. In this case, the total length of the first arm waveguide 507 disturbed by the divided grooves is set to be a predetermined value. Further, the interval from the end face to end face of the neighboring grooves is set to 15

μm. With the configuration in FIG. 12A, the radiation loss of the light wave in the grooves 514 can be reduced compared to the configuration in FIG. 7, and therefore, a superior optical wavelength multiplexing and demultiplexing circuit in the loss characteristics can be realized.

Figure 12B:
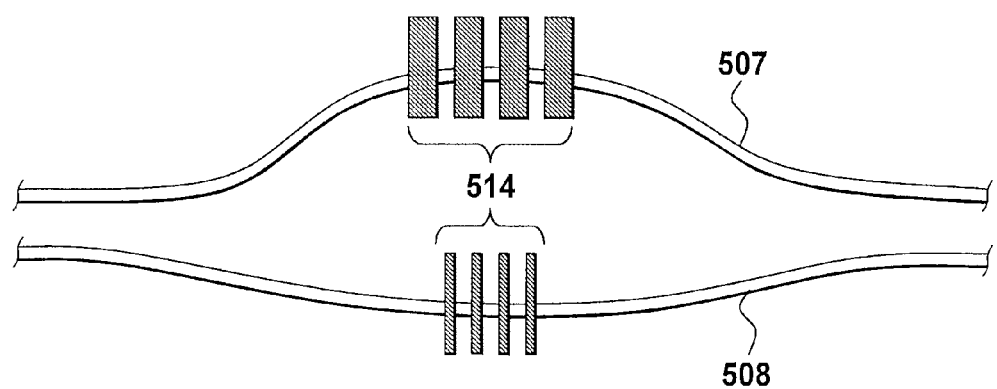
FIG. 12B is a diagram showing still another configuration example of the first arm waveguide and the second arm waveguide.

FIG. 12B is an enlarged view of the vicinity of the first arm waveguide 507 and the second arm waveguide 508 in still another configuration. In the configuration in FIG. 12B, the grooves 514 are formed in the middle of both the first arm waveguide 507 and the second arm waveguide 508 and divided into four pieces, respectively. In this case, the difference between the total length of the first arm waveguide 507 disturbed by the divided grooves and the total length of the second arm waveguide 508 disturbed by the divided grooves is set to be a predetermined value. Further, the interval from the end face to end face of the neighboring grooves is set to 15 μm. With the configuration in FIG. 12B, even if a manufacture error occurs in the groove width of the grooves 514, the influence on the optical path length difference between the first arm waveguide 507 and the second arm waveguide 508 is reduced compared to the configuration in FIG. 7 or FIG. 12A, and therefore, a superior optical wavelength multiplexing and demultiplexing circuit in the manufacture tolerance can be realized.

Figure 13A:
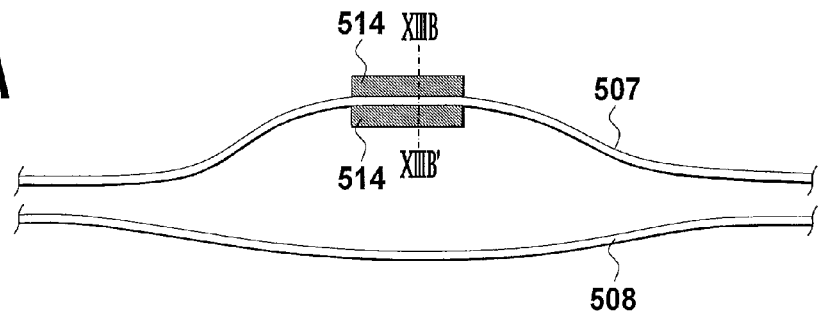
FIG. 13A is a diagram showing still another configuration example of the first arm waveguide and the second arm waveguide.
Figure 13B:
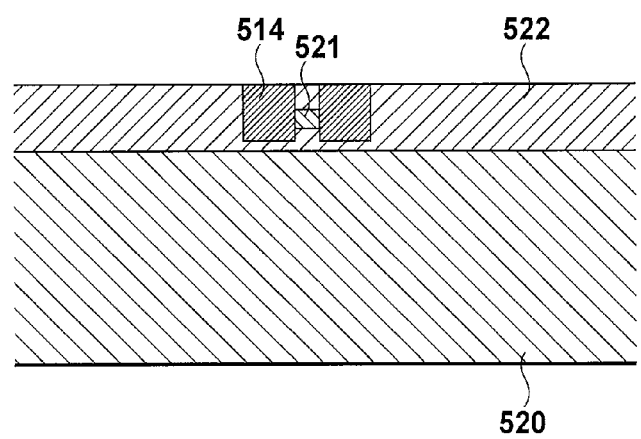
FIG. 13B is a section view along a segment XIIIB-XIIIB' in FIG. 13A.

FIG. 13A is an enlarged plane view of the vicinity of the first arm waveguide 507 and the second arm waveguide 508 in still another configuration, and FIG. 13B is a section view of a portion at a segment XIIIB-XIIIB' in FIG. 13A. The waveguide with the structure shown in FIG. 13A and FIG. 13B is disclosed in Non-Patent Literature 3. As shown, a waveguide core 521 and a clad 522 of the waveguide 507 are formed on a silicon substrate 520. In the configuration of FIG. 13A and FIG. 13B, the grooves 514 are formed to partially contact with both side surfaces of the core of the first arm waveguide 507 and inserted with silicone resin, a temperature compensating material. In this case, the length of the grooves 514 in contact with the core side surfaces is set to 1,300 μm. This configuration in FIG. 13A and FIG. 13B, as the configuration in FIG. 7, can cause a change with temperature in the optical path length difference between the first arm waveguide 507 and the second arm waveguide 508, and the loss caused by the influence of the grooves 514 can be suppressed compared to the configuration in FIG. 7, FIG. 12A and FIG. 12B, and therefore, a superior optical wavelength multiplexing and demultiplexing circuit in the loss characteristics can be realized.

Figure 13C:
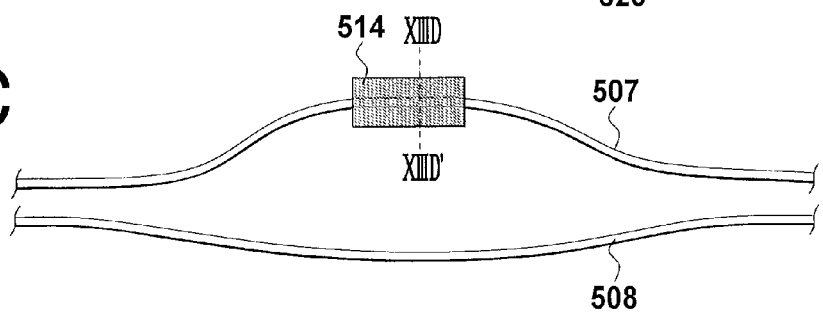
FIG. 13C is a diagram showing still another configuration example of the first arm waveguide and the second arm waveguide.
Figure 13D:
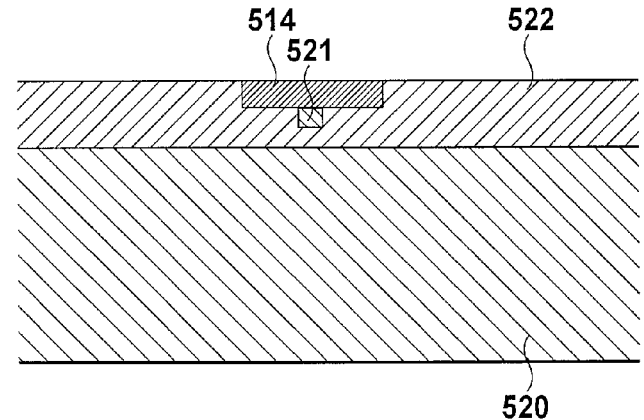
FIG. 13D is a section view along a segment XIIID-XIIID' in FIG. 13C.

FIG. 13C is an enlarged plane view of the vicinity of the first arm waveguide 507 and the second arm guide 508 in still another configuration, and FIG. 13D is a section view of a portion at a segment XIIID-XIIID' in FIG. 13C. Reference numerals are the same as those in FIG. 13A and FIG. 13B. In the configuration of FIG. 13C and FIG. 13D, the groove 514 is formed to partially contact with the core top surface of the first arm waveguide 507 and inserted with silicone resin, temperature compensating material. In this case, the length of the groove 514 in contact with the core top surface is set to be 3,000 μm. This configuration in FIG. 13C and FIG. 13D, as the configuration in FIG. 7, can cause a change with temperature in the optical path length difference between the first arm waveguide 507 and the second arm guide 508, and the loss caused by the influence of the groove 514 can be suppressed compared to the configuration in FIG. 7, FIG. 12A and FIG. 12B, and therefore, a superior optical wavelength multiplexing and demultiplexing circuit in the loss characteristics can be realized.

In the present embodiment, as shown in FIG. 7, as the optical mode combining coupler 509, the asymmetric directional coupler is applied. However, the implementation of the optical mode combining coupler 509 is not limited to this configuration.

Figure 14:
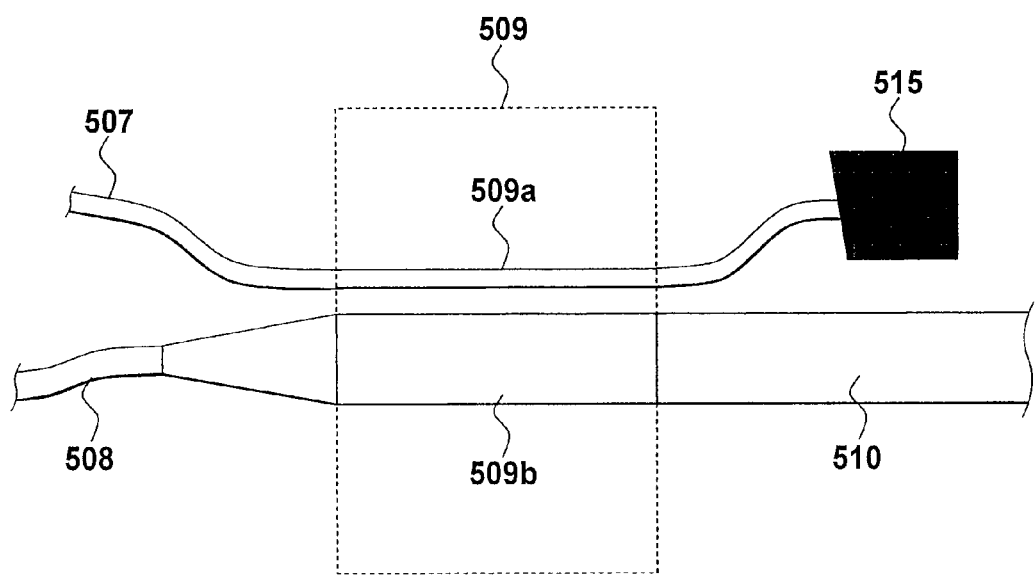
FIG. 14 is a diagram showing another configuration example of an optical mode combining coupler.

FIG. 14 is an enlarged view of the vicinity of the optical mode combining coupler 509 in another configuration. In the configuration of FIG. 14, an asymmetric directional coupler as in FIG. 7 is used. However, the output waveguide connected to the waveguide 509a is terminated by a groove 515. Into the groove 515, a light-blocking material is inserted, such as absorbing light waves, and the boundary surface between the light-blocking material and the output waveguide is not vertical to the waveguide, but inclined by 8 degrees from the vertical plane. This configuration in FIG. 14, compared to the configuration in FIG. 7, can block the light waves which remained slightly without coupling from the waveguide 509a to the waveguide 509b and suppress stray light from invading the first slab waveguide 502 etc., and further the reflection of light waves can be suppressed. Therefore, a superior optical wavelength multiplexing and demultiplexing circuit in the crosstalk characteristics and the reflection characteristics can be realized.

Figure 15:
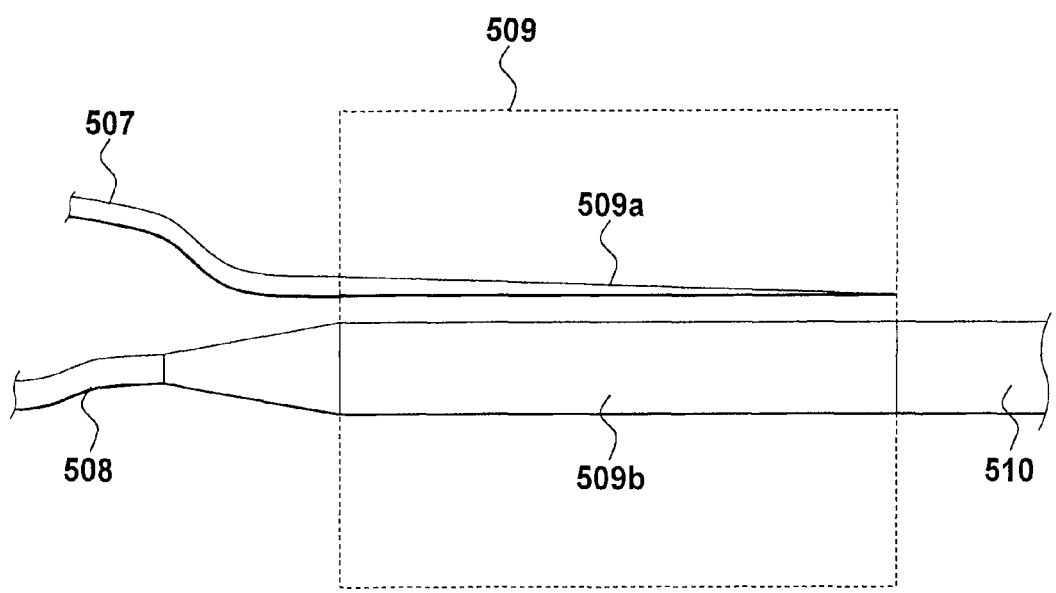
FIG. 15 is a diagram showing still another configuration example of an optical mode combining coupler.

FIG. 15 is an enlarged view of the vicinity of the optical mode combining coupler 509 in still another configuration. In the configuration of FIG. 15, an asymmetric directional coupler as in FIG. 7 is used. However, it is structured to terminate the waveguide 509a with its width being decreased gradually and finally zeroed. In this case, the length of the waveguides 509a, 509b is designed to be 1,500 μm. This configuration in FIG. 15, can achieve almost 100% of a coupling rate of light waves from the waveguide 509a to the waveguide 509b, and therefore, a superior optical wavelength multiplexing and demultiplexing circuit in the loss characteristics compared to the configuration in FIG. 7 can be realized.

Figure 16:
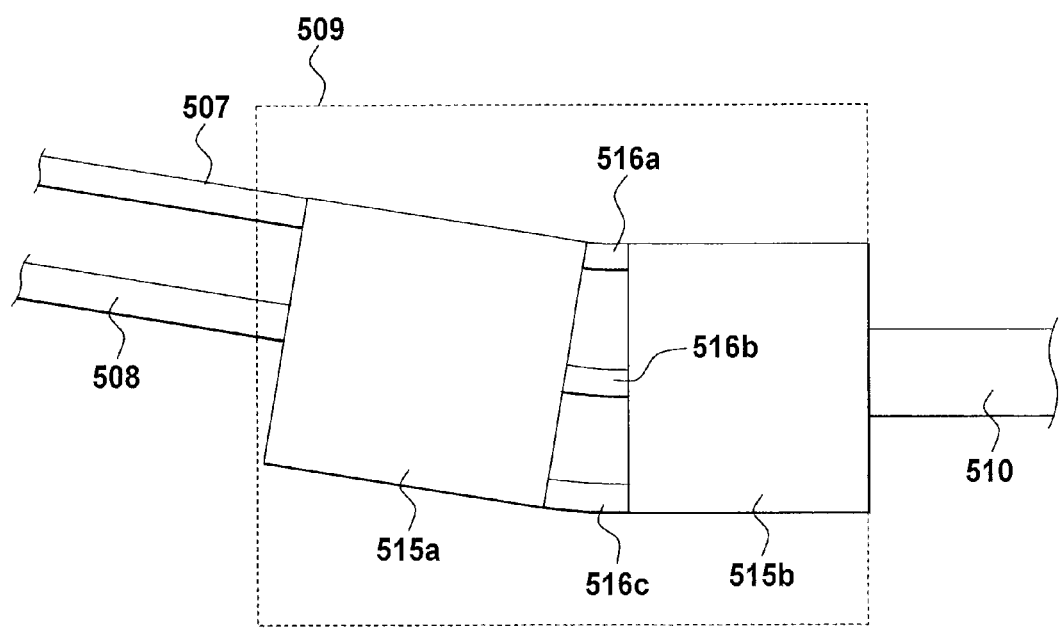
FIG. 16 is a diagram showing still another configuration example of an optical mode combining coupler.

FIG. 16 is an enlarged view of the vicinity of the optical mode combining coupler 509 in still another configuration. In the configuration in FIG. 16, the optical mode combining coupler 509 comprises two multi-mode interferometers (MMI). This configuration is described in detail in Non-Patent Literature 2. The optical mode combining coupler 509 comprises a first MMI 515a, a second MMI 515b and intermediate waveguides 516a, 516b and 516c. The first MMI 515a has a width of 20 μm and a length of 754 μm, the second MMI 515b has a width of 20 μm and a length of 377 μm, the intermediate waveguide 516a has a width of 4.5 μm and a length of 50 μm, the intermediate waveguide 516b has a width of 4.5 μm and a length of 51.5 μm, and the intermediate waveguide 516c has a width of 4.5 μm and a length of 53 μm. In general, MMI has a smaller change in the branching characteristics with respect to the change in the waveguide width compared to the directional coupler. Consequently, with the configuration in FIG. 16, even if a manufacture error occurs in the width of the waveguide, since the coupling rate is not affected, at which the fundamental mode light incident from the arm waveguide 507 couples with the first mode of the multimode waveguide 510, a superior optical wavelength multiplexing and demultiplexing circuit in the manufacture tolerance can be realized compared to the configuration in FIG. 7.

In the present embodiment, as in FIG. 7, a single directional coupler is applied as the optical splitter 506. However, implementation of the optical splitter 506 is not limited to this configuration. For example, the optical splitter 506 can be implemented by a Y branch circuit or MMI. More preferably, the optical splitter 506 is implemented by a wavelength insensitive coupler (WINC).

Figure 17:
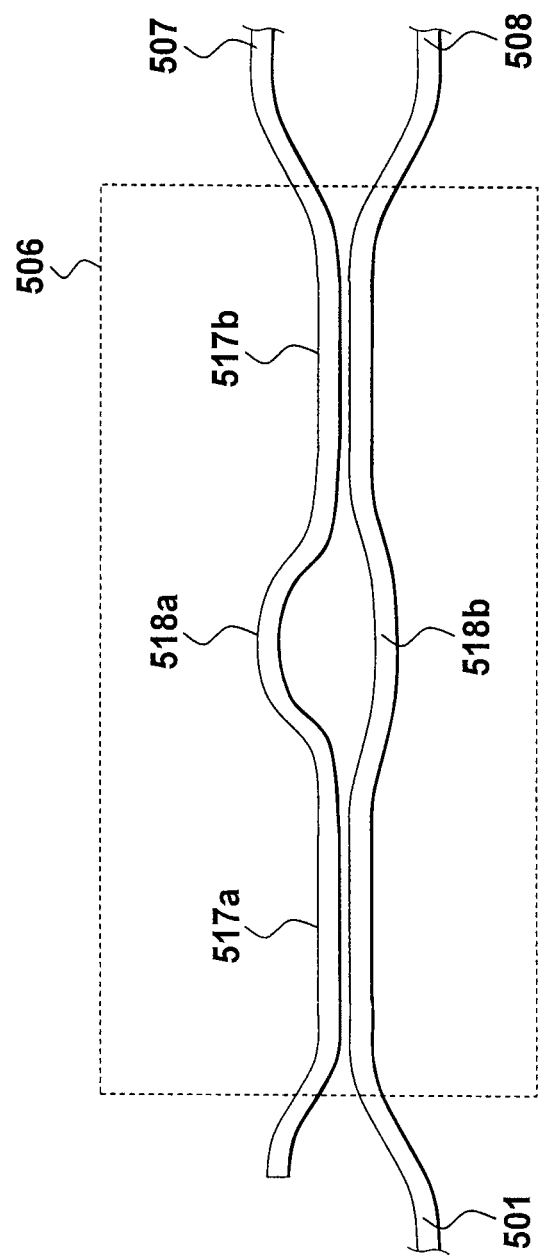
FIG. 17 is a diagram showing an optical splitter composed of a WINC.

FIG. 17 is an enlarged view of the vicinity of the optical splitter 506 configured by the WINC. The optical splitter 506 comprises two directional couplers 517*a* and 517*b* and two arm waveguides 518*a* and 518*b*. The coupling rates of the directional couplers 517*a*, 517*b* are 86% and 97%, respectively, the optical path length difference of the arm waveguide 518*a* with respect to the arm waveguide 518*b* is 0.45 μm, and the WINC functions as an optical splitter having a branching ratio of 11%. This configuration in FIG. 17, using the WINC, can realize an optical wavelength multiplexing and demultiplexing circuit that operates in a wider wavelength range compared to the configuration in FIG. 7, using a single coupler, because of less wavelength dependence in the branching ratio.

(Second Embodiment)

Figure 18:
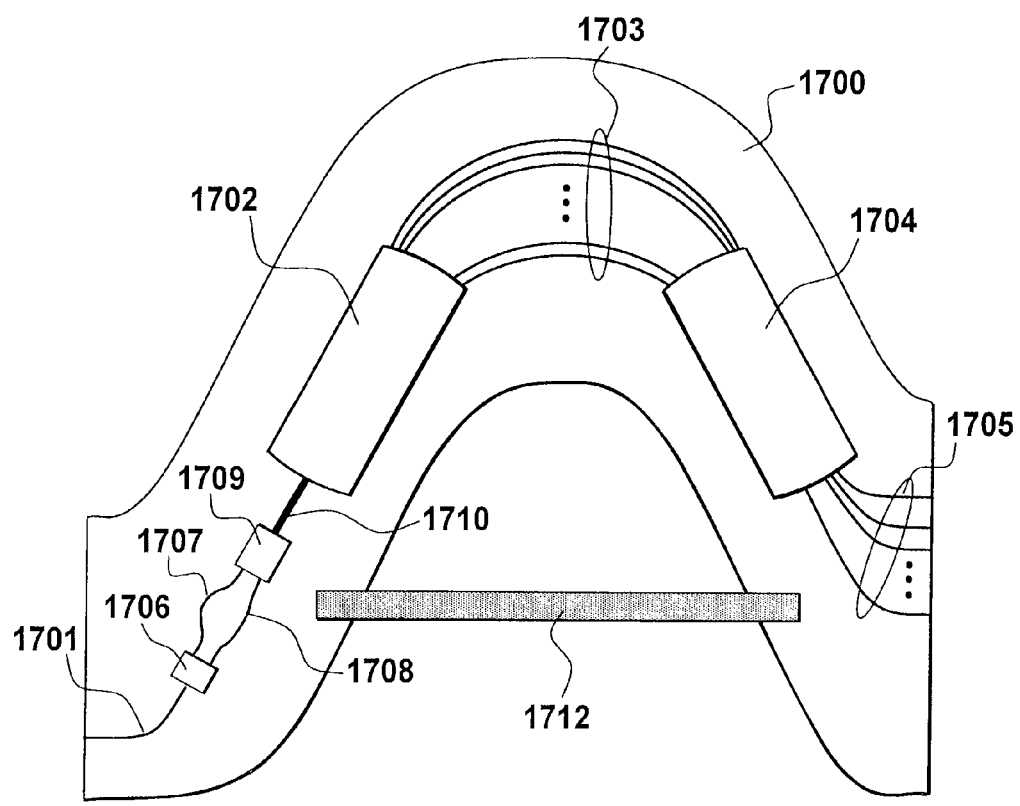
FIG. 18 is a diagram showing a configuration example of an athermal AWG according to a second embodiment of the present invention.

FIG. 18 shows a configuration example of an athermal AWG according to a second embodiment of the present invention. The athermal AWG 1700 comprises a first input/output waveguide 1701, a first slab waveguide 1702, arrayed waveguides 1703, a second slab waveguide 1704 and second input/output waveguides 1705. The athermal AWG 1700 further comprises an optical splitter 1706, a first arm waveguide 1707, a second arm waveguide 1708, an optical mode combining coupler 1709 and a multimode waveguide 1710 between the first input/output waveguide 1701 and the first slab waveguide 1702. The chip of the athermal AWG in the present embodiment is cut into an arc shape along the circuit of the AWG, and both ends thereof are joined by a metal rod 1712. Note that the material of the metal rod 1712 is aluminum in the present embodiment.

In FIG. 18, the arrayed waveguides 1703 are designed so as to increase in length successively by a fixed amount ΔL. In the athermal AWG, the waveguide has a relative refractive index of refraction difference Δ of 1.5%, a core thickness of 4.5 μm, and a temperature coefficient of effective refractive index=$1.0\times10^{-5}+1.9\times10^{-8}\times T$. The core width of the first input/output waveguide 1701, the arrayed waveguides 1703, the second input/output waveguides 1705, the first arm waveguide 1707, and the second arm waveguide 1708 is 4.5 μm, the number of wavelength channels is 32, the transmission wavelength at the center wavelength channel is 1,544.53 nm (194.1 THz), and the wavelength channel interval is 0.8 nm (100 GHz). In this case, the number of the arrayed waveguides is 130 and ΔL is 42.4 μm. The length of the first slab waveguide 1702 and the second slab waveguide 1704 is 6,100 μm and the second input/output waveguides 1705 are arranged as many as the number of the wavelength channels, i.e., 32, at intervals of 15 μm on the connected part to the second slab waveguide 1704.

The metal rod 1712 expands and contracts depending on temperature in accordance with the thermal expansion coefficient of the material. In this case, the shape of the AWG chip joined also changes in such a manner that ΔL becomes small by the metal rod expanding at high temperature and ΔL becomes large by the metal rod contracting at low temperature. Thus, by appropriately setting the length of the metal rod, the variation with temperature in the optical path length difference (product of the effective refractive index of the waveguide and ΔL) between the neighboring arrayed waveguides is suppressed and the primary temperature dependence at the transmission center wavelength is compensated.

Figure 19:
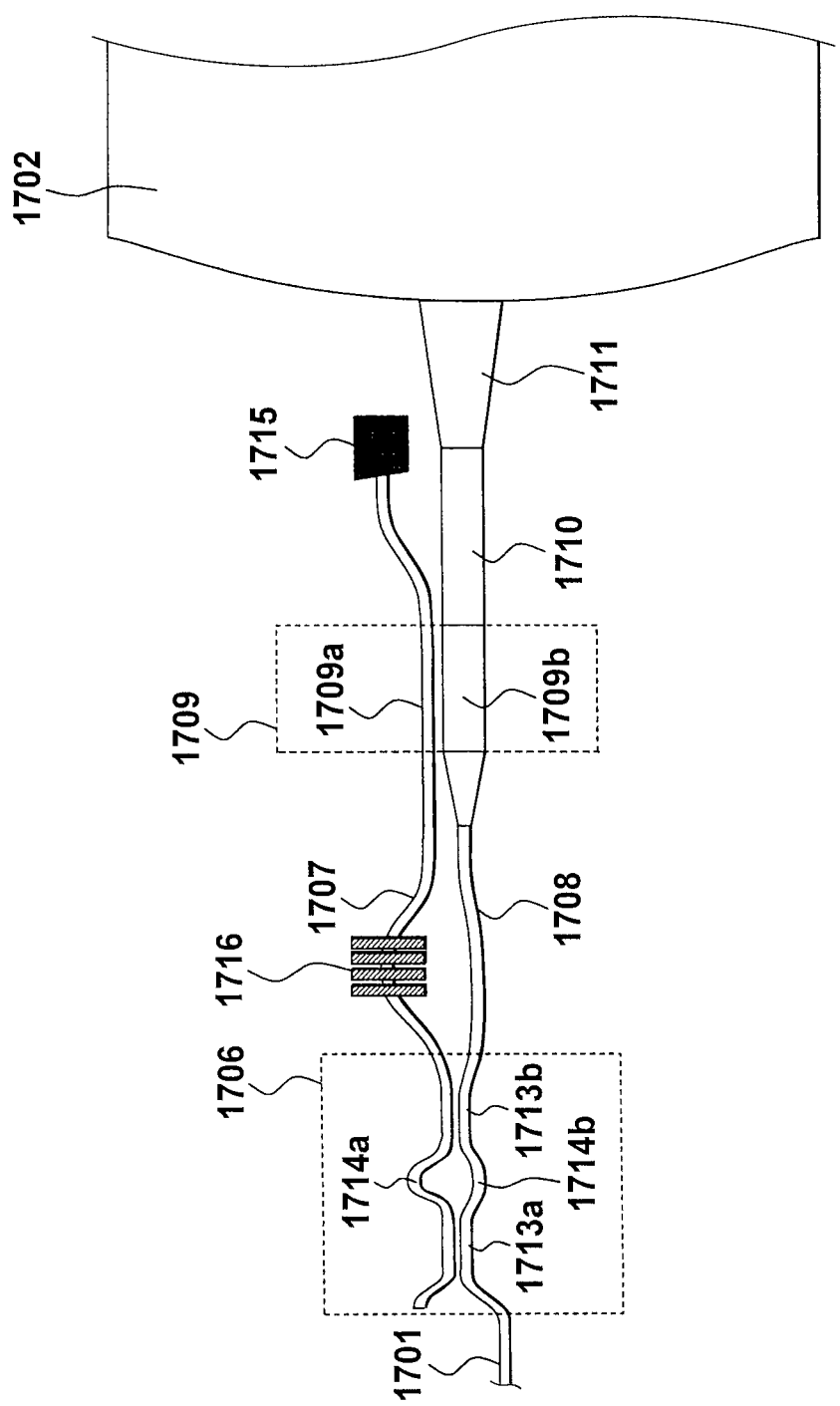
FIG. 19 is an enlarged view of a portion from an optical splitter to a multimode waveguide in FIG. 18.

FIG. 19 is an enlarged view of a portion from the optical splitter 1706 to the multimode waveguide 1710 in the athermal AWG in FIG. 18. Reference numerals are the same as those in FIG. 18. However, in the present embodiment, the multimode waveguide 1710 is connected to the first slab waveguide 1702 via a linearly tapered waveguide 1711. The waveguide width of the multimode waveguide 1710 is 8 μm and the waveguide width of the linearly tapered waveguide 1711 is 11.5 μm at the connected part to the first slab waveguide 1702.

As the optical splitter 1706, an WINC is used, which is composed of directional couplers 1713*a* and 1713*b* and arm waveguides 1714*a* and 1714*b*. The coupling rates of the directional couplers 1713*a*, 1713*b* are 85% and 95%, respectively, and the optical path length difference of the arm waveguide 1714*a* with respect to the arm waveguide 1714*b* is 0.46 μm, and the WINC functions as an optical splitter having a branching ratio of 10%.

As the optical mode combining coupler 1709, a directional coupler having an asymmetric waveguide width is used, and the width of a waveguide 1709*a* connected to the first arm waveguide 1707 is set to 2.5 μm, the width of a waveguide 1709*b* connected to the second arm, waveguide 1708 is set to 8 μm, and the length of the waveguides 1709*a*, 1709*b* is set to 500 μm. The waveguide width from the second arm waveguide 1708 to the waveguide 1709*b* is smoothly converted by a linear taper. The coupling rate of the optical mode combining coupler 1709 from the waveguide 1709*a* to the waveguide 1709*b* is designed to be 70%.

An output waveguide connected to the waveguide 1709*a* is terminated by a groove 1715 and a light-blocking material is inserted into the groove 1715, such as absorbing light waves. The boundary surface between the light-blocking material and the output waveguide is not vertical to the waveguide, but inclined by 8 degrees from the vertical plane.

In the middle of the first arm waveguide 1707, a groove 1716 is formed and filled with silicone resin (temperature coefficient of refractive index $\alpha'=-3.5\times10^{-4}+1.5\times10^{-7}\times T$), a temperature compensating material. The groove 1716 is divided into four pieces and the total length of the first arm waveguide 1707 disturbed by the divided grooves is set to be 23 μm and the interval from the end face to end face of the neighboring grooves is set to 15 μm.

The change with temperature in the optical path length difference of the first arm waveguide 1707 with respect to the second arm waveguide 1708 in the present embodiment is the same as that in FIG. 10. Note that the operating temperature range of the optical wavelength multiplexing and demultiplexing circuit is set to −40 to 80° C. In this operating temperature range, the optical path length difference changes from +0.50 μm to −0.50 μm. Due to this, the phase difference between the fundamental mode light and the first mode light generated in the optical mode combining coupler 1709 will change by 1.3π. Along with the phase change, at the connection part of the linear taper 1711 and the first slab waveguide 1702, the same change with temperature in the optical field as that in FIG. 8B occurs.

Figure 20:
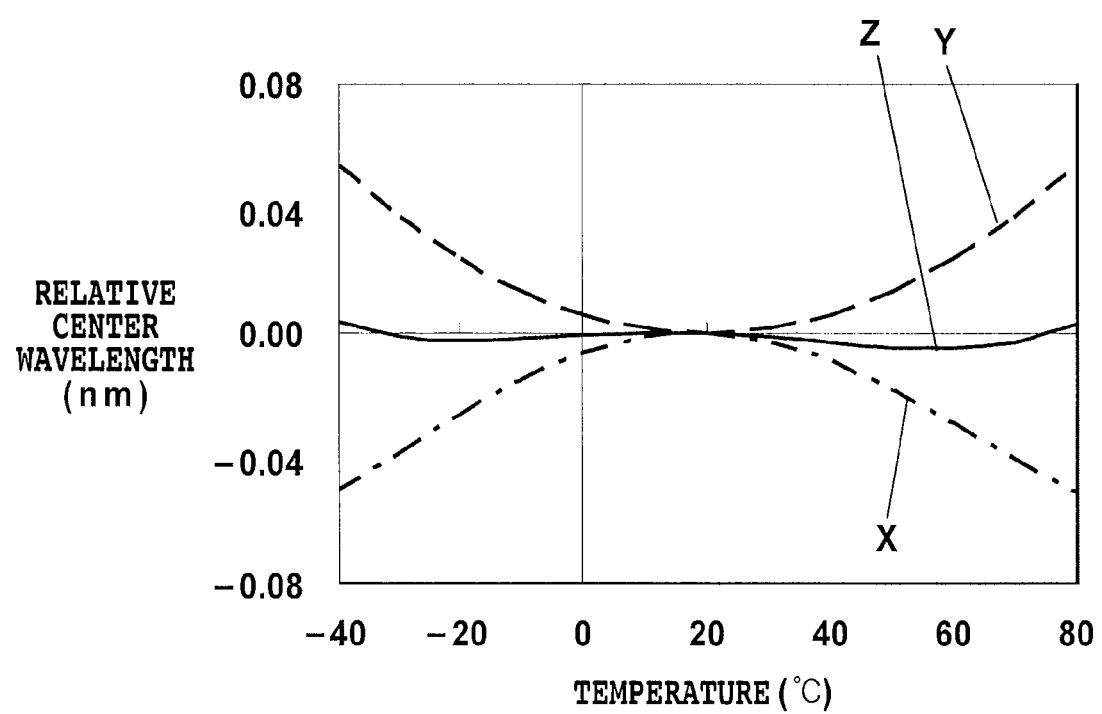
FIG. 20 is a diagram for explaining a variation with temperature in the transmission center wavelength in the second embodiment of the present invention.

FIG. 20 is a graph for explaining the variation with temperature in the transmission center wavelength in the athermal AWG of the present embodiment. The line X indicates the variation with temperature in the transmission center wavelength due to the variation in the peak position in the optical field. The line Y indicates the high-order temperature dependence at the transmission center wavelength remained in the AWG in which the primary temperature dependence has been compensated by the thermal expansion and contraction of the metal rod 1712. The temperature dependence at the transmission center wavelength of the whole AWG circuit is indicated as the line Z. In this wavelength multiplexing and demultiplexing circuit, the variation with temperature in the transmission center wavelength in the range of −40 to 80° C. is 0.008 nm, and therefore, it can be seen that the high-order variation with temperature in the transmission center wavelength remained in the athermal AWG according to the conventional art is compensated almost completely.

(Third Embodiment)

Figure 21:
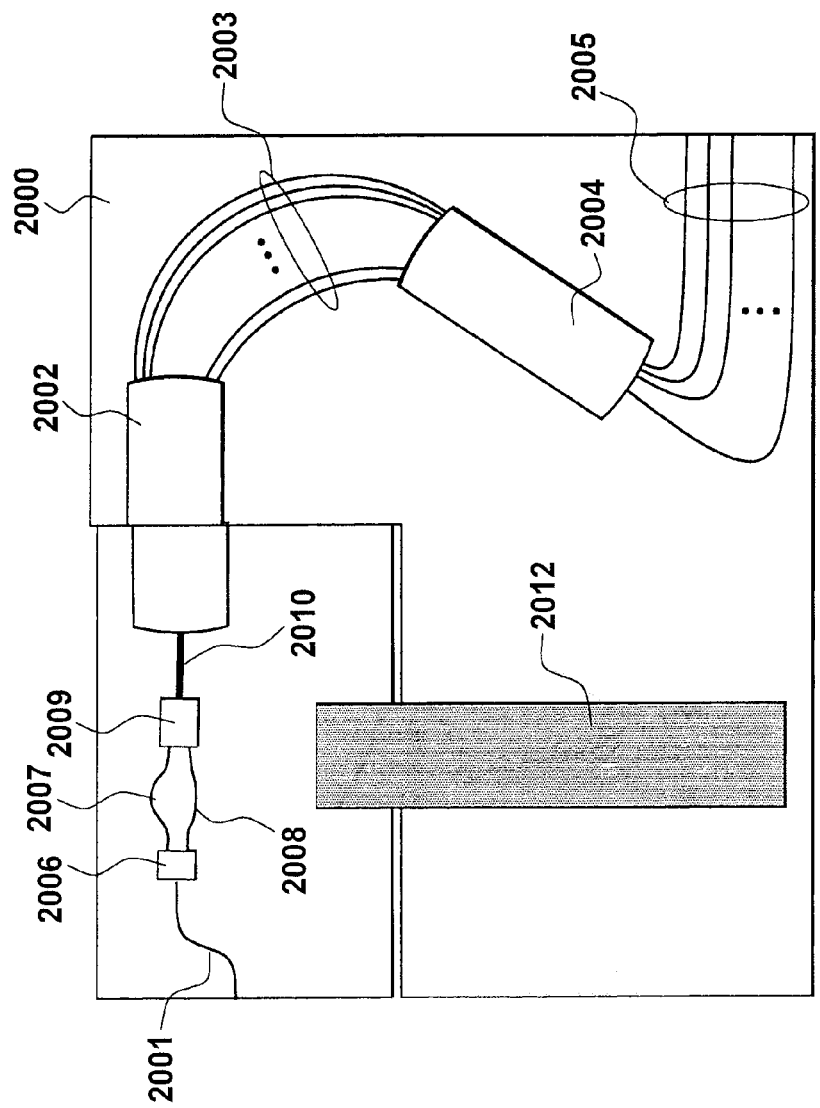
FIG. 21 is a diagram showing a configuration example of an athermal AWG according to a third embodiment of the present invention.

FIG. 21 is a configuration example of an athermal AWG according to a third embodiment of the present invention. The athermal AWG 2000 comprises a first input/output waveguide 2001, a first slab waveguide 2002, arrayed waveguides 2003, a second slab waveguide 2004 and second input/output waveguides 2005. The athermal AWG 2000 further comprises an optical splitter 2006, a first arm waveguide 2007, a second arm waveguide 2008, an optical mode combining coupler 2009 and a multimode waveguide 2010 between the first input/output waveguide 2001 and the first slab waveguide 2002. The athermal AWG according to the present embodiment is cut into two chips so as to divide the first slab waveguide 2002 and these two chips are joined by a metal plate 2012. Note that the material of the metal is aluminum in the present embodiment.

In FIG. 21, the arrayed waveguides 2003 are designed so as to increase in length successively by a fixed amount $\Delta L$. In the athermal AWG, the waveguide has a relative refractive index difference $\Delta$ of 1.5%, a core thickness of 4.5 μm, a temperature coefficient of effective refractive index $\alpha=1.0\times10^{-5}+1.9\times10^{-8}\times T$. The core width of the first input/output waveguide 2001, the arrayed waveguides 2003, the second input/output waveguides 2005, the first arm waveguide 2007, and the second arm waveguide 2008 is 4.5 μm, the number of wavelength channels is 32, the transmission wavelength at the center wavelength channel is 1,544.53 nm (194.1 THz), and the wavelength channel interval is 0.8 nm (100 GHz). In this case, the number of the arrayed waveguides is 130 and $\Delta L$ is 42.4 μm. The length of the first slab waveguide 2002 and the second slab waveguide 2004 is 6,100 μm and the second input/output waveguides 2005 are arranged as many as the number of the wavelength channels, i.e., 32, at intervals of 15 μm on the connected part to the second slab waveguide 2004.

The metal plate 2012 expands and contracts depending on temperature in accordance with the thermal expansion coefficient of the material. In this case, the relative position of the two chips joined changes, and with reference to the chip on the side of the arrayed waveguide 2003, the chip on the side of the first input/output waveguide 2001 moves upward in the figure by the metal plate 2012 expanding at high temperature and moves downward in the figure by the metal plate 2012 contracting at low temperature. Hence, by appropriately setting the length of the metal plate, it can cause the change in the position of the chip on the side of the first input/output waveguide 2001 so as to compensate for the variation with temperature in the optical path length difference in the arrayed waveguides 2003, and with this structure, the primary temperature dependence at the transmission center wavelength in the AWG is compensated.

Figure 22:
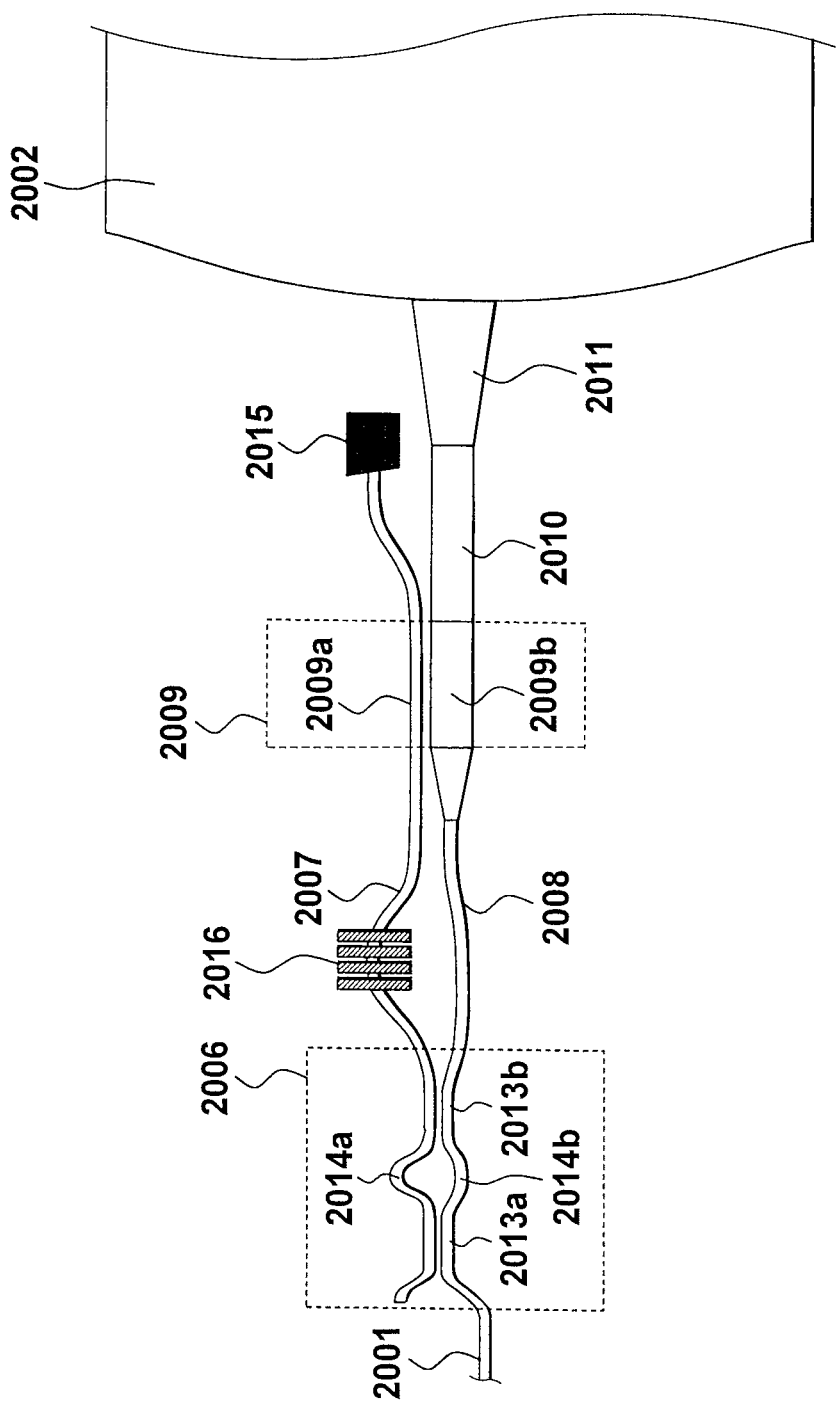
FIG. 22 is an enlarged view of a portion from an optical splitter to a multimode waveguide in FIG. 21.

FIG. 22 is an enlarged view of a portion from the optical splitter 2006 to the multimode waveguide 2010 in the athermal AWG of FIG. 21. Reference numerals are the same as those in FIG. 21. However, in the present embodiment, the multimode waveguide 2010 is connected to the first slab waveguide 2002 via a linearly tapered waveguide 2011. The waveguide width of the multimode waveguide 2010 is 8 μm and the waveguide width of the linearly tapered waveguide 2011 is 11.5 μm at the connected part to the first slab waveguide 2002.

As the optical splitter 2006, an WINC is used, which is composes of directional couplers 2013a and 2013b and arm waveguides 2014a and 2014b. Here, the coupling rates of the directional couplers 2013a, 2013b are 85% and 95%, respectively, the optical path length difference of the arm waveguide 2014a with respect to the arm waveguide 2014b is 0.46 μm, and the WINC functions as an optical splitter having a branching ratio of 10%.

As the optical mode combining coupler 2009, a directional coupler having an asymmetric waveguide width is used and the width of a waveguide 2009a connected to the first arm waveguide 2007 is set to 2.5 μm, the width of a waveguide 2009b connected to the second arm, waveguide 2008 is set to 8 μm, and the length of the waveguides 2009a, 2009b is set to 500 μm. The waveguide width from the second arm waveguide 2008 to the waveguide 2009b is smoothly converted by a linear taper. The coupling rate of the optical mode combining coupler 2009 from the waveguide 2009a to the waveguide 2009b is designed to be 70%.

An output waveguide connected to the waveguide 2009a is terminated by a groove 2015 and a light-blocking material is inserted into the groove 2015, such as absorbing light waves. The boundary surface between the light-blocking material and the output waveguide is not vertical to the waveguide, but inclined by 8 degrees from the vertical plane.

In the middle of the first arm waveguide 2007, a groove 2016 is formed and filled with silicone resin (temperature coefficient of refractive index $\alpha'=-3.5\times10^{-4}+1.5\times10^{-7}\times T$), a temperature compensating material. The groove 2016 is divided into four pieces and the total length of the first arm waveguide 2007 disturbed by the divided grooves is set to be 23 μm and the interval from the end face to end face of the neighboring grooves is set to 15 μm.

The change with temperature in the optical path length difference of the first arm waveguide 2007 with respect to the second arm waveguide 2008 in the present embodiment is the same as that in FIG. 10. Note that the operating temperature range of the optical wavelength multiplexing and demultiplexing circuit is −40 to 80° C. In this operating temperature range, the optical path length difference changes from +0.50 μm to −0.50 μm. Due to this, the phase difference between the fundamental mode light and the first mode light generated in the optical mode combining coupler 2009 will change by 1.3π. Along with the phase change, at the connection part of the linear taper 2011 and the first slab waveguide 2002, the similar change with temperature in the optical field as that in FIG. 8B occurs.

Figure 23:
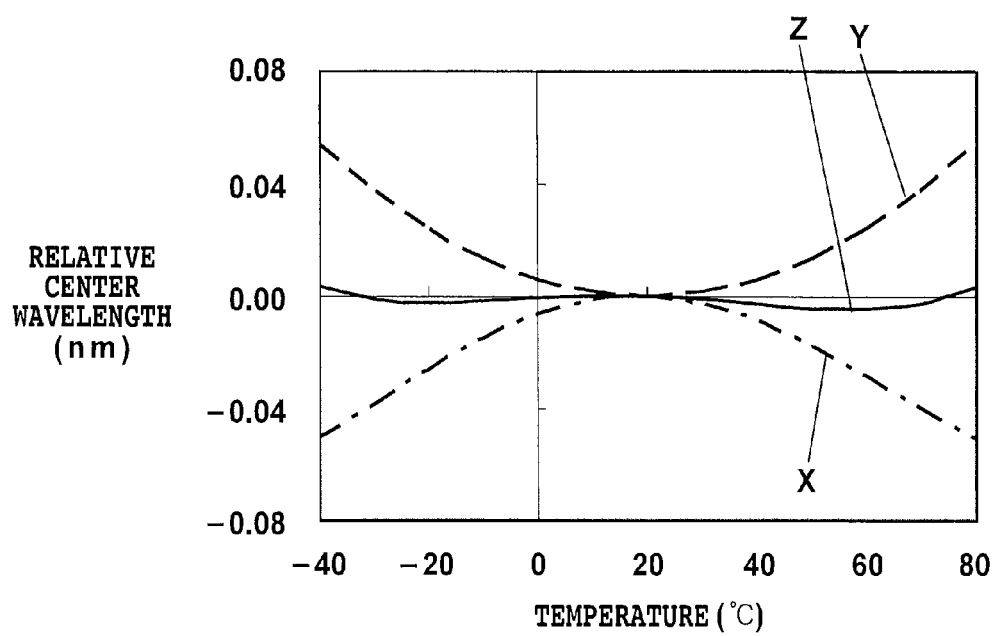
FIG. 23 is a diagram for explaining a variation with temperature in the transmission center wavelength in the third embodiment of the present invention.

FIG. 23 is a graph for explaining the variation with temperature in the transmission center wavelength in the athermal AWG of the present embodiment. The line X indicates the variation with temperature in the transmission center wavelength due to the variation in the peak position in the optical field. The line Y indicates the high-order temperature dependence at the transmission center wavelength remained in the AWG in which the primary temperature dependence has been compensated by the thermal expansion and contraction of the metal rod 2012. The temperature dependence at the transmission center wavelength of the whole AWG circuit is indicated as the line Z. In this wavelength multiplexing and demultiplexing circuit, the variation with temperature in the transmission center wavelength in the range of −40 to 80° C. is 0.008 nm, and therefore, it can be seen that the high-order variation with temperature in the transmission center wavelength remained in the athermal AWG according to the conventional art is compensated almost completely.

(Fourth Embodiment)

Figure 24:
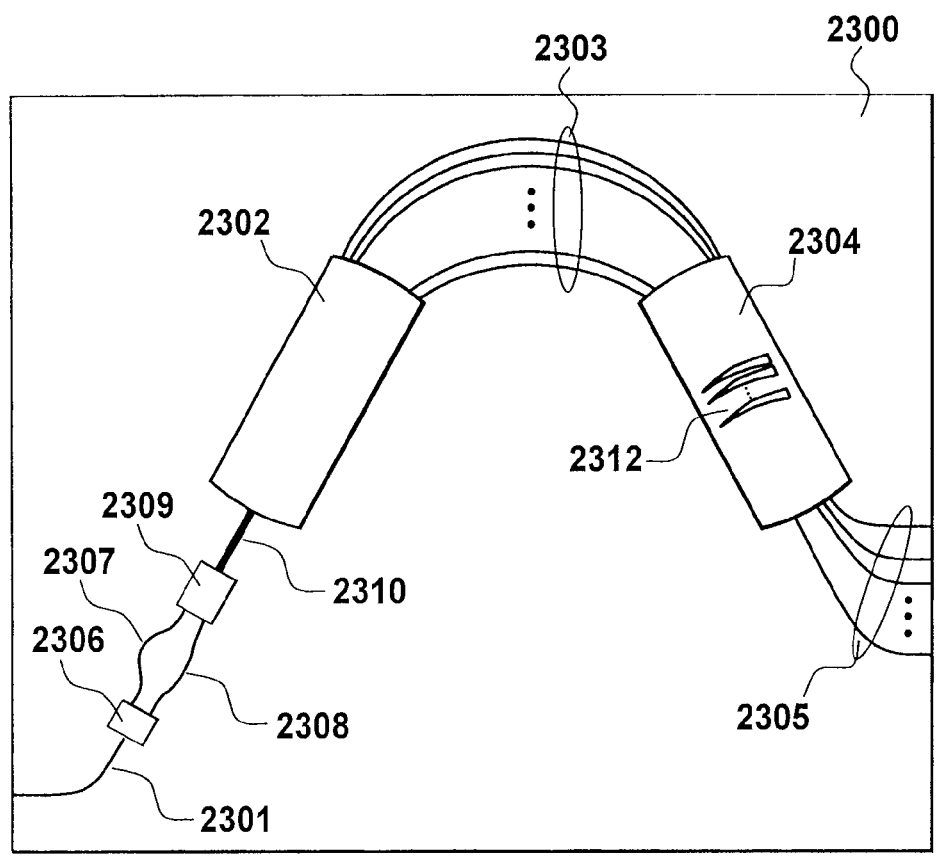
FIG. 24 is a diagram showing a configuration example of an athermal AWG according to a fourth embodiment of the present invention.

FIG. 24 is a configuration example of an athermal AWG according to a fourth embodiment of the present invention. The athermal AWG 2300 comprises a first input/output waveguide 2301, a first slab waveguide 2302, arrayed waveguides 2303, a second slab waveguide 2304 and second input/output waveguides 2305. The athermal AWG 2300 further comprises an optical splitter 2306, a first arm waveguide 2307, a second arm waveguide 2308, an optical mode combining coupler 2309 and a multimode waveguide 2310 between the first input/output waveguide 2301 and the first slab waveguide 2302. In the second slab waveguide 2304, grooves 2312 are formed, which are filled with a temperature compensating material.

The length of the arrayed waveguides 2303 is designed to increase in length successively by a fixed amount ΔL. In parallel with this, the length for the light wave, which passes through respective arrayed waveguides and passes through the center wavelength channel, to be disturbed by the grooves 2312 in the second slab waveguide 2304 increases successively by an amount ΔL' in proportion to ΔL. In the athermal AWG, the waveguide has a relative refractive index difference Δ of 1.5%, a core thickness of 4.5 μm, a temperature coefficient of effective refractive index α=1.0×10$^{-5}$+1.9×10$^{-8}$×T. The core width of the first input/output waveguide 2301, the arrayed waveguides 2303, the second input/output waveguides 2305, the first arm waveguide 2307, and the second arm waveguide 2308 is 4.5 μm. The number of wavelength channels is 32, the transmission wavelength of the center wavelength channel is 1,544.53 nm (194.1 THz), the wavelength channel interval is 0.8 nm (100 GHz), and the temperature compensating material is silicone resin (temperature coefficient of refractive index α'=-3.5×10$^{-4}$+1.5×10$^{-7}$×T). In this case, the number of the arrayed waveguides is 150 and ΔL is 42.4 μm.

The path length difference ΔL' given by the temperature compensating material filled in the grooves 2312 is designed to be ΔL'=ΔL/(1-α'/α)=1.18 μm assuming that T=20° C., thereby the primary temperature dependence at the transmission center wavelength is compensated. Further, the length of the first slab waveguide 2302 and the second slab waveguide 2304 is 7,300 μm and the second input/output waveguides 2305 are arranged as many as the number of the wavelength channels, i.e., 32, at intervals of 18 μm on the connected part to the second slab waveguide 2304.

Figure 25:
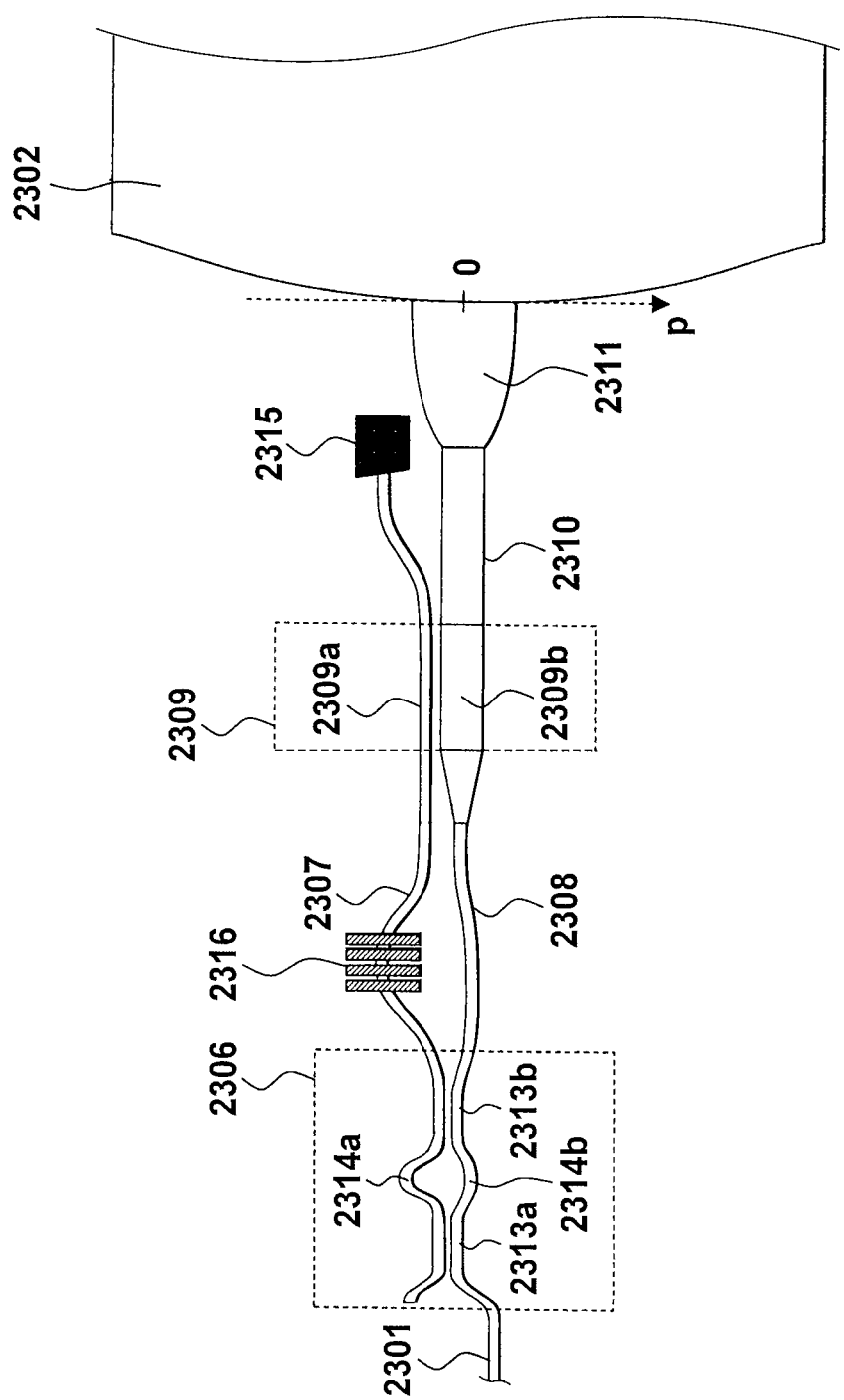
FIG. 25 is an enlarged view of a portion from an optical splitter to a multimode waveguide in FIG. 24.

FIG. 25 is an enlarged view of a portion from the optical splitter 2306 to the multimode waveguide 2310 in the athermal AWG in FIG. 24. Reference numerals are the same as those in FIG. 24. However, in the present embodiment, the multimode waveguide 2310 is connected to the first slab waveguide 2302 via a parabolic tapered waveguide 2311. The waveguide width of the multimode waveguide 2310 is 8 μm and the waveguide width of the parabolic tapered waveguide 2311 is 16 μm at the connected part to the first slab waveguide 2302.

As the optical splitter 2306, an WINC is used, which is composed of directional couplers 2313a and 2313b and arm waveguides 2314a and 2314b. Here, the coupling rates of the directional couplers 2313a, 2313b are 90% and 94%, respectively, the optical path length difference of the arm waveguide 2314a with respect to the arm waveguide 2314b is 0.49 μm, and the WINC functions as an optical splitter having a branching ratio of 4%.

As the optical mode combining coupler 2309, a directional coupler having an asymmetric waveguide width is used and the width of a waveguide 2309a connected to the first arm waveguide 2307 is set to 2.5 m, the width of a waveguide 2309b connected to the second arm waveguide 2308 is set to 8 μm, and the length of the waveguides 2309a, 2309b is set to 500 μm. The waveguide width from the second arm waveguide 2308 to the waveguide 2309b is smoothly converted by a linear taper. The coupling rate of the optical mode combining coupler 2309 from the waveguide 2309a to the waveguide 2309b is designed to be 70%.

An output waveguide connected to the waveguide 2309a is terminated by a groove 2315 and a light-blocking material is inserted into the groove 2315, such as absorbing light waves. The boundary surface between the light-blocking material and the output waveguide is not vertical to the waveguide, but inclined by 8 degrees from the vertical plane.

In the middle of the first arm waveguide 2307, a groove 2316 is formed and filled with silicone resin (temperature coefficient of refractive index α'=-3.5×10$^{-4}$+1.5×10$^{-7}$×T), which is a temperature compensating material. The groove 2316 is divided into four pieces and the total length of the first arm waveguide 2307 disturbed by the divided grooves is set to be 23 μm and the interval from the end face to end face of the neighboring grooves is set to 15 μm.

The change with temperature in the optical path length difference of the first arm waveguide 2307 with respect to the second arm waveguide 2308 in the present embodiment is the same as that in FIG. 10. Note that the operating temperature range of the optical wavelength multiplexing and demultiplexing circuit is -40 to 80° C. In this operating temperature range, the optical path length difference changes from +0.50 μm to -0.50 μm. Due to this, the phase difference between the fundamental mode light and the first mode light generated in the optical mode combining coupler 2309 will change by 1.3π.

Figure 26:
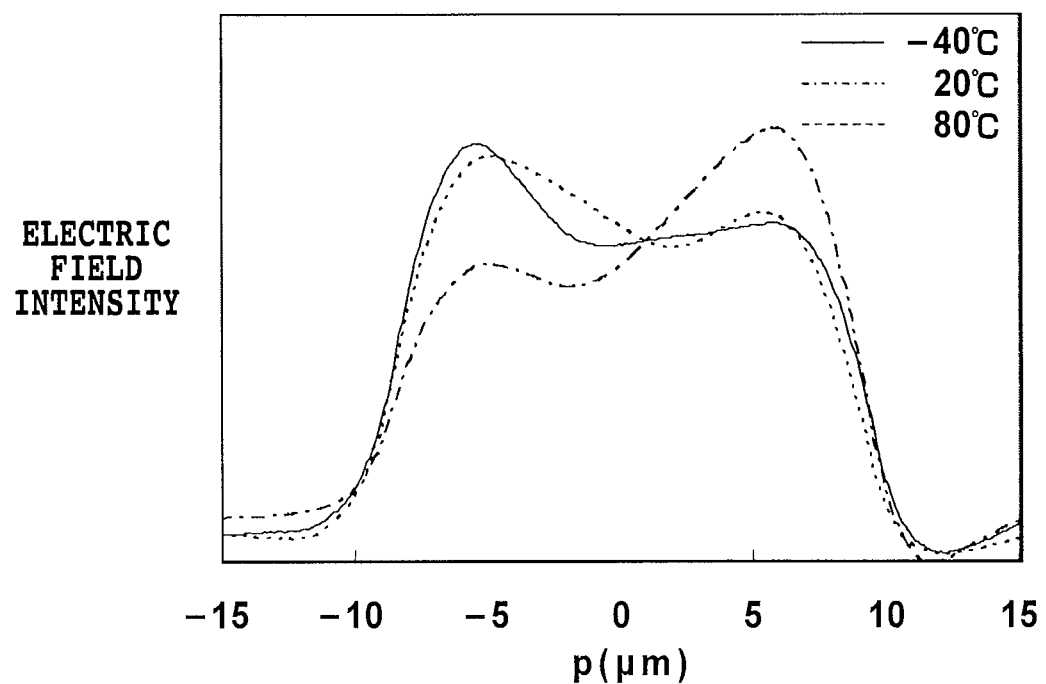
FIG. 26 is a graph showing a change with temperature in the optical field distribution at a connection part of a parabolic tapered waveguide with a first slab waveguide for a change in the optical path length difference as in FIG. 8A in the fourth embodiment of the present invention.

FIG. 26 is a graph showing a change with temperature in the optical field distribution at the connection part with the first slab waveguide 2302 of the parabola tapered waveguide 2311 for the change in optical path length difference as that in FIG. 8A. The horizontal axis p in the graph as shown in FIG. 25 indicates the relative position with the center of the parabola tapered waveguide 511 as the origin. In FIG. 26, the optical field distribution at temperatures -40, 20 and 80° C. is shown.

Part of the fundamental mode light incident from the multimodewaveguide 2310 to the parabola tapered waveguide 2311 is converted into the 2nd mode light, turning into a twin-peak-shaped field at the end of the parabola tapered waveguide 2311. In this case, the power ratio and the phase difference between the fundamental mode light and the 2nd mode light are determined by the shape of the parabola tapered waveguide 2311, which hardly change with temperature. On the other hand, the first mode light incident from the multimode waveguide 2310 to the parabola tapered waveguide 2311 reaches the terminal of the parabola tapered waveguide 2311 remained as the first mode. By the effect of the first mode light, the twin-peak-shaped field at the end of the parabola tapered waveguide 2311 becomes an asymmetric field and the degree of its asymmetry is determined by the phase differences between the fundamental and 2nd mode light and the first mode light. According to FIG. 26, in the operating temperature range, along with the change in the phase differences between the fundamental and 2nd mode light and the first mode light, the degree of asymmetry of the light wave field changes and the barycentric position of the light power changes from about -0.4 μm to +0.4 μm and changes further to -0.4 μm.

Figure 27A:
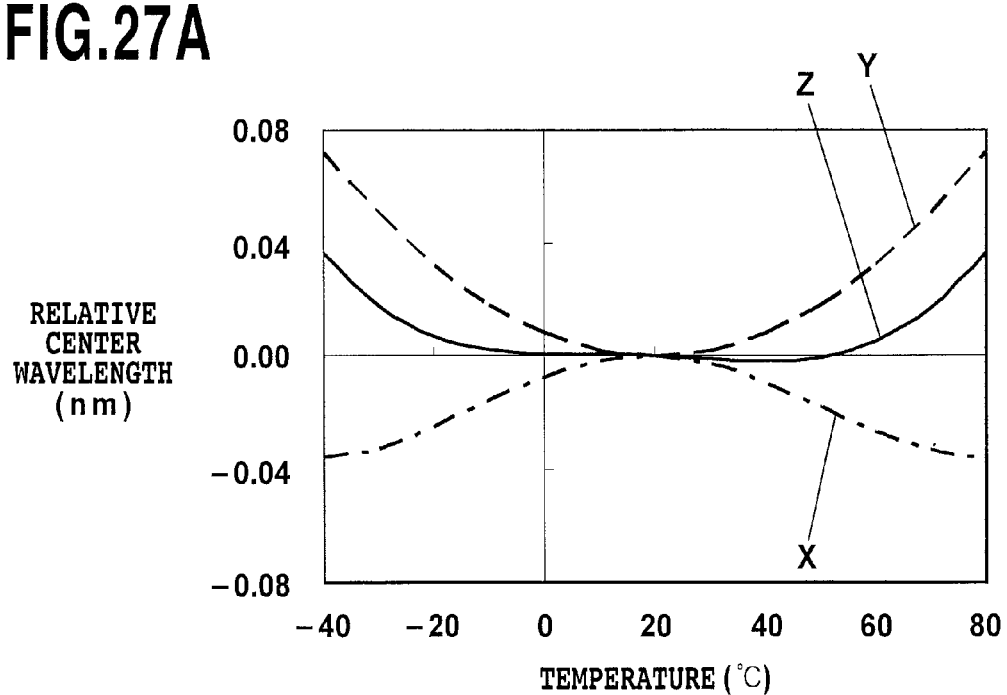
FIG. 27A is a graph showing a variation with temperature in the transmission center wavelength in the fourth embodiment of the present invention.

FIG. 27A is a graph for explaining the variation with temperature in the transmission center wavelength in the athermal AWG of the present embodiment. The line X indicates the variation with temperature in the transmission center wavelength due to the variation in the barycenter of the optical field. The line Y indicates the high-order temperature dependence at the transmission center wavelength remained in the AWG in which the primary temperature dependence has been compensated from the first slab waveguide 2302 to the second input/output waveguide 2305. The temperature dependence at the transmission center wavelength of the whole AWG circuit is indicated as the line Z.

Figure 27B:
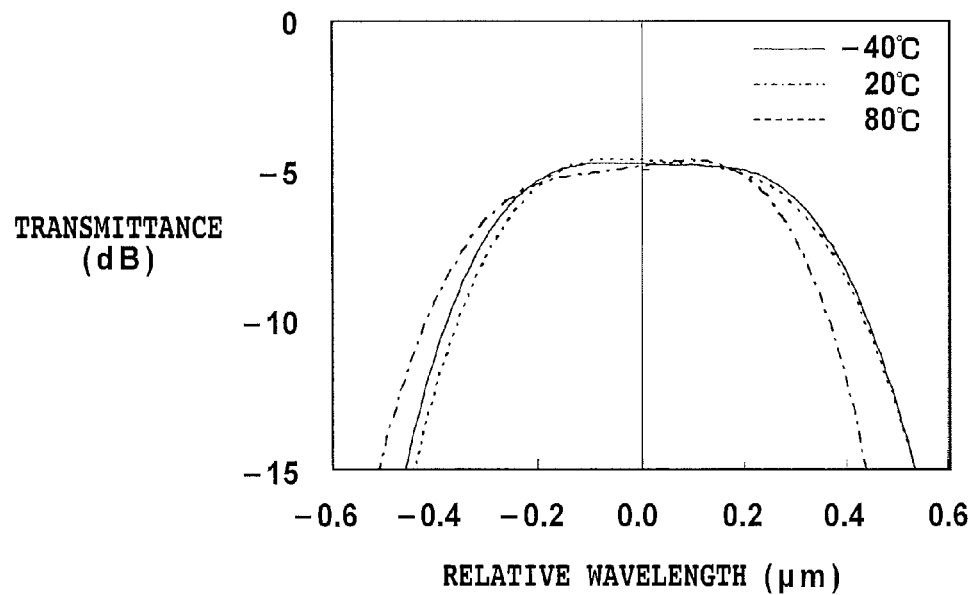
FIG. 27B is a graph showing a transmission waveform at each temperature in the fourth embodiment of the present invention.

FIG. 27B is a graph showing the transmission waveform at temperatures −40, 20 and 80° C. in the athermal AWG of the present embodiment. When the twin-peak-shaped field is excited in the parabola tapered waveguide 2311, a waveform with a wide transmission band is realized. From the figure, it can be observed that the variation with temperature in the transmission center wavelength is suppressed while the degree of asymmetry of the transmission waveform changes.

From FIG. 27A and FIG. 27B, in the optical wavelength multiplexing and demultiplexing circuit in the present embodiment, it can be seen that the variation with temperature in the transmission center wavelength is suppressed to 0.04 nm in the range of −40 to 80° C., having a wide transmission band and the high-order variation with temperature in the transmission center wavelength remained in the athermal AWG by the conventional art is compensated.

(Fifth Embodiment)

Figure 28:
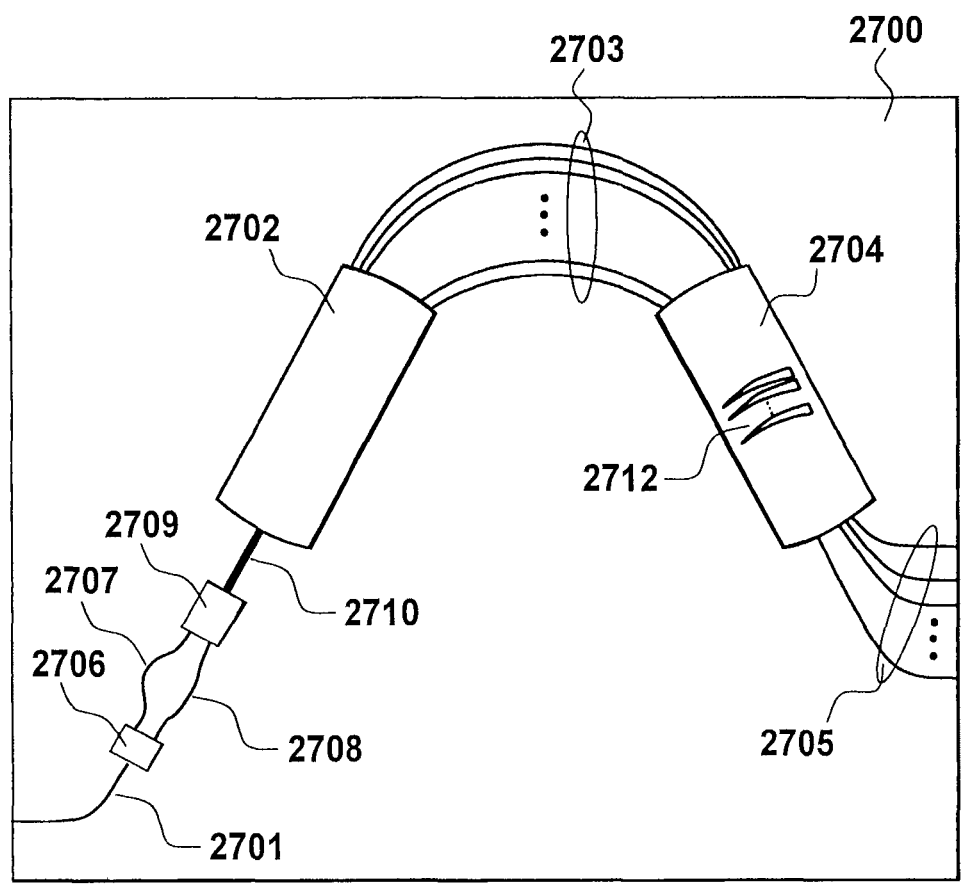
FIG. 28 is a diagram showing a configuration example of an athermal AWG according to a fifth embodiment of the present invention.

FIG. 28 is a configuration example of an athermal AWG according to a fifth embodiment of the present invention. The athermal AWG 2700 comprises a first input/output waveguide 2701, a first slab waveguide 2702, arrayed waveguides 2703, a second slab waveguide 2704 and second input/output waveguides 2705. The athermal AWG 2700 further comprises an optical splitter 2706, a first arm waveguide 2707, a second arm waveguide 2708, an optical mode combining coupler 2709 and a multimode waveguide 2710 between the first input/output waveguide 2701 and the first slab waveguide 2702. In the second slab waveguide 2704, grooves 2712 are formed, which are filled with a temperature compensating material.

The length of the arrayed waveguides 2703 is designed to increase in length successively by a fixed amount ΔL. In parallel with this, the length for the light wave, which passes through respective arrayed waveguides and passes through the center wavelength channel, to be disturbed by the grooves 2712 in the second slab waveguide 2704 increases successively by an amount ΔL' in proportion to ΔL. In the athermal AWG, the waveguide has a relative refractive index difference Δ of 1.5%, a core thickness of 4.5 μm, a temperature coefficient of effective refractive index $\alpha=1.0\times10^{-5}+1.9\times10^{-8}\times T$. The core width of the first input/output waveguide 2701, the arrayed waveguides 2703, the second input/output waveguides 2705, the first arm waveguide 2707, and the second arm waveguide 2708 is 4.5 μm. The number of wavelength channels is 32, the transmission wavelength of the center wavelength channel is 1,544.53 nm (194.1 THz), the wavelength channel interval is 0.8 nm (100 GHz), and the temperature compensating material is silicone resin (temperature coefficient of refractive index $\alpha'=-3.5\times10^{-4}+1.5\times10^{-7}\times T$). In this case, the number of the arrayed waveguides is 150 and ΔL is 42.4 μm.

The path length difference ΔL' given by the temperature compensating material filled in the grooves 2712 is designed to be $\Delta L'=\Delta L/(1-\alpha'/\alpha)=1.18$ μm assuming that T=20° C., thereby the primary temperature dependence at the transmission center wavelength is compensated. Further, the length of the first slab waveguide 2702 and the second slab waveguide 2704 is 7,300 μm and the second input/output waveguides 2705 are arranged as many as the number of the wavelength channels, i.e., 32, at intervals of 18 μm on the connected part to the second slab waveguide 2704.

Figure 29:
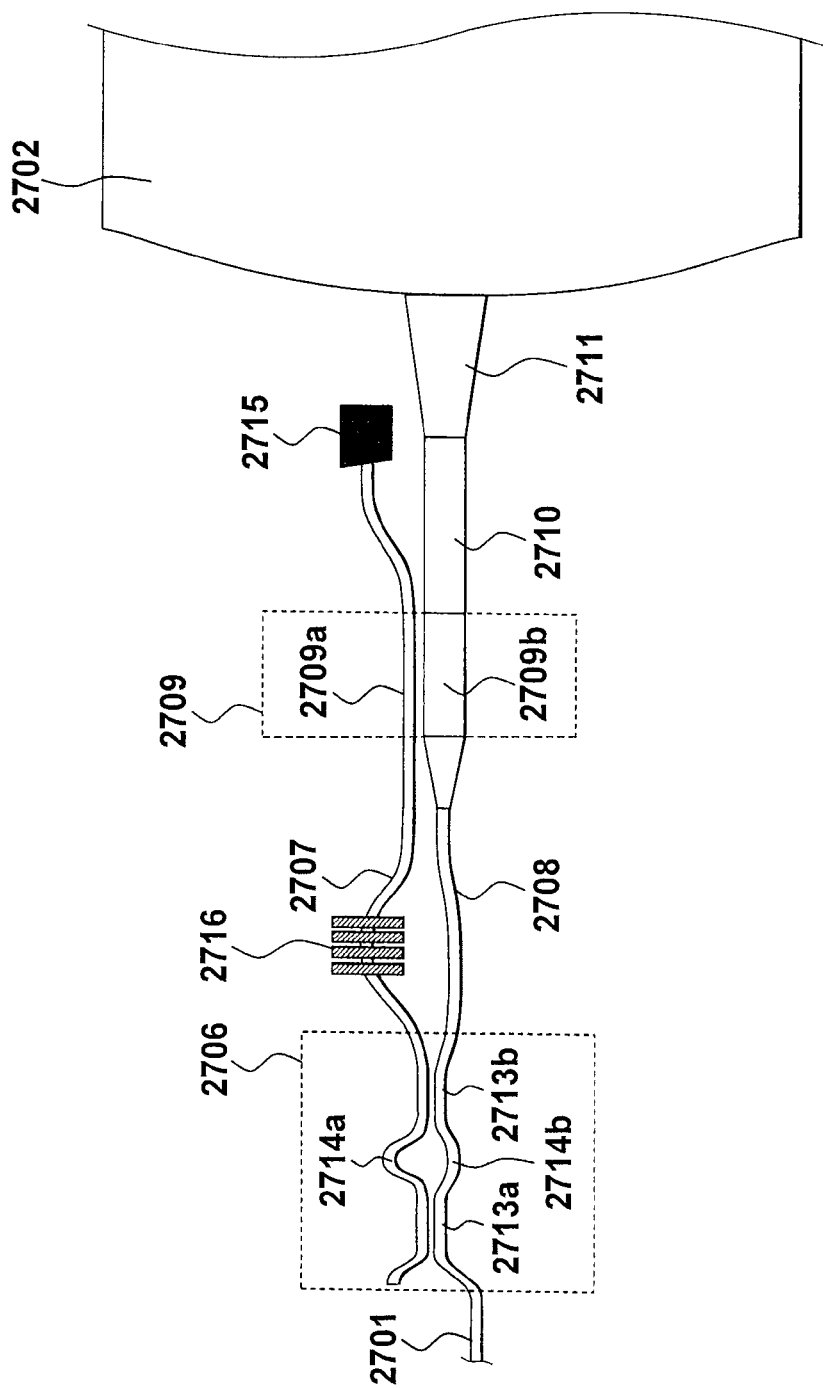
FIG. 29 is an enlarged view of a portion from an optical splitter to a multimode waveguide in FIG. 28.

FIG. 29 is an enlarged view of a portion from the optical splitter 2706 to the multimode waveguide 2710 in the athermal AWG in FIG. 28. Reference numerals are the same as those in FIG. 28. However, in the present embodiment, the multimode waveguide 2710 is connected to the first slab waveguide 2702 via a linearly tapered waveguide 2711. The waveguide width of the multimode waveguide 2710 is 8 μm and the waveguide width of the linearly tapered waveguide 2711 is 10 μm at the connected part to the first slab waveguide 2702.

As the optical splitter 2706, an WINC is used, which is composed of directional couplers 2713a and 2713b and arm waveguides 2714a and 2714b. The coupling rates of the directional couplers 2713a, 2713b are 86% and 97%, respectively, the optical path length difference of the arm waveguide 2714a with respect to the arm waveguide 2714b is 0.45 μm, and the WINC functions as an optical splitter having a branching ratio of 11%.

As the optical mode combining coupler 2709, a directional coupler having an asymmetric waveguide width is used and the width of a waveguide 2709a connected to the first arm waveguide 2707 is set to 2.5 μm, the width of a waveguide 2709b connected to the second arm waveguide 2708 is set to 8 μm, and the length of the waveguides 2709a, 2709b is set to 500 μm. The waveguide width from the second arm waveguide 2708 to the waveguide 2709b is smoothly converted by a linear taper. The coupling rate of the optical mode combining coupler 2709 from the waveguide 2709a to the waveguide 2709b is designed to be 70%.

An output waveguide connected to the waveguide 2709a is terminated by a groove 2715 and a light-blocking material is inserted into the groove 2715, such as absorbing light waves. The boundary surface between the light-blocking material and the output waveguide is not vertical to the waveguide, but inclined by 8 degrees from the vertical plane.

In the middle of the first arm waveguide 2707, a groove 2716 is formed and filled with silicone resin (temperature coefficient of refractive index $\alpha'=-3.5\times10^{-4}+1.5\times10^{-7}\times T$), which is a temperature compensating material. The groove 2716 is divided into four pieces and the total length of the first arm waveguide 2707 disturbed by the divided grooves is set to be 23 μm and the interval from the end face to end face of the neighboring grooves is set to 15 μm.

Figure 30:
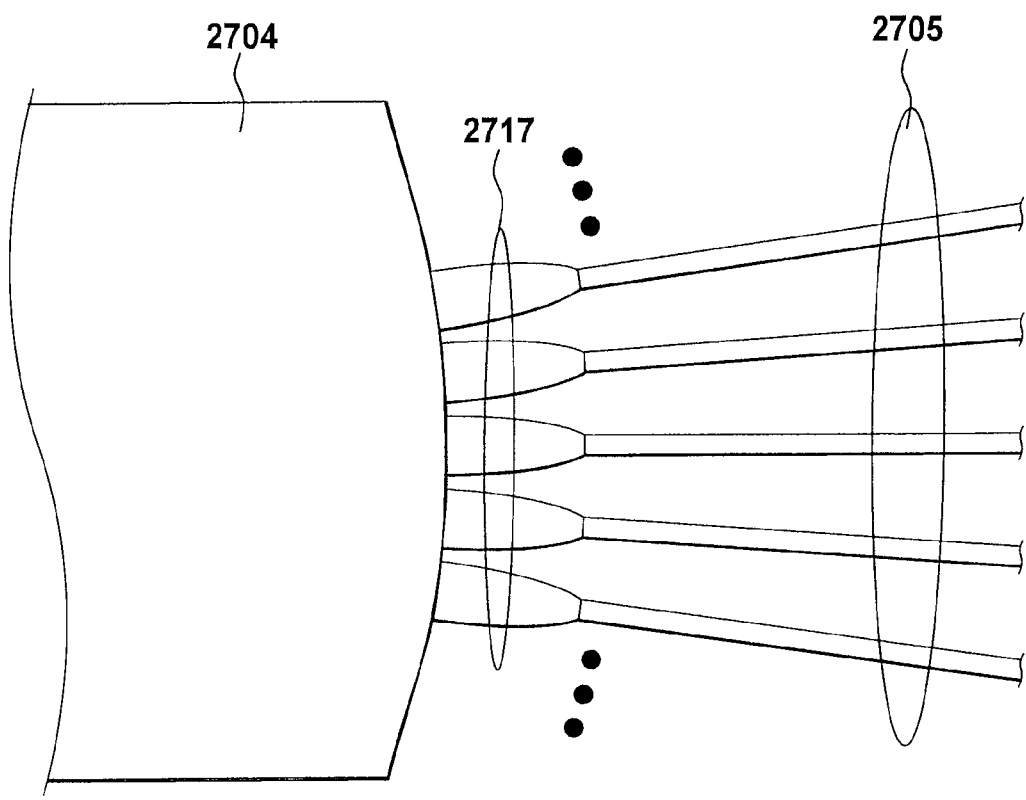
FIG. 30 is an enlarged view of a connection part of a second slab waveguide and a second input/output waveguide in FIG. 28.

FIG. 30 is an enlarged view of the vicinity of the connection part of the second slab waveguide 2704 and the second input/output waveguides 2705 in the athermal AWG in FIG. 28. Reference numerals are the same as those in FIG. 28. However, in the present embodiment, all the second input/output waveguides 2705 are connected to the second slab waveguide 2704 via parabolic tapered waveguides 2717. The waveguide width of the parabola tapered waveguide 2717 is 16 μm at the connected part to the second slab waveguide 2704.

At the end of the parabola tapered waveguides 2717, part of the fundamental mode light is converted into the 2nd mode light, turning to a twin-peak-shaped field. In this case, the power ratio and the phase difference between the fundamental mode light and the 2nd mode light are determined by the shape of the parabola tapered waveguide 2717, which hardly change with temperature. Because the shape of the parabola tapered waveguide 2717 is symmetric with respect to the center axis, the first mode light is not excited.

The change with temperature in the optical path length difference of the first arm waveguide 2707 with respect to the second arm waveguides 2708 in the present embodiment is the same as that in FIG. 10. Note that the operating temperature range of the optical wavelength multiplexing and demultiplexing circuit is −40 to 80° C. In this operating temperature range, the optical path length difference changes from +0.50 μm to −0.50 μm. Due to this, the phase difference between the fundamental mode light and the first mode light generated in the optical mode combining coupler 2709 will change by 1.3π. Along with this phase change, at the connection part of the linear taper 2711 and the first slab waveguide 2702, the similar change with temperature in the optical field as that in FIG. 8B occurs.

Figure 31A:
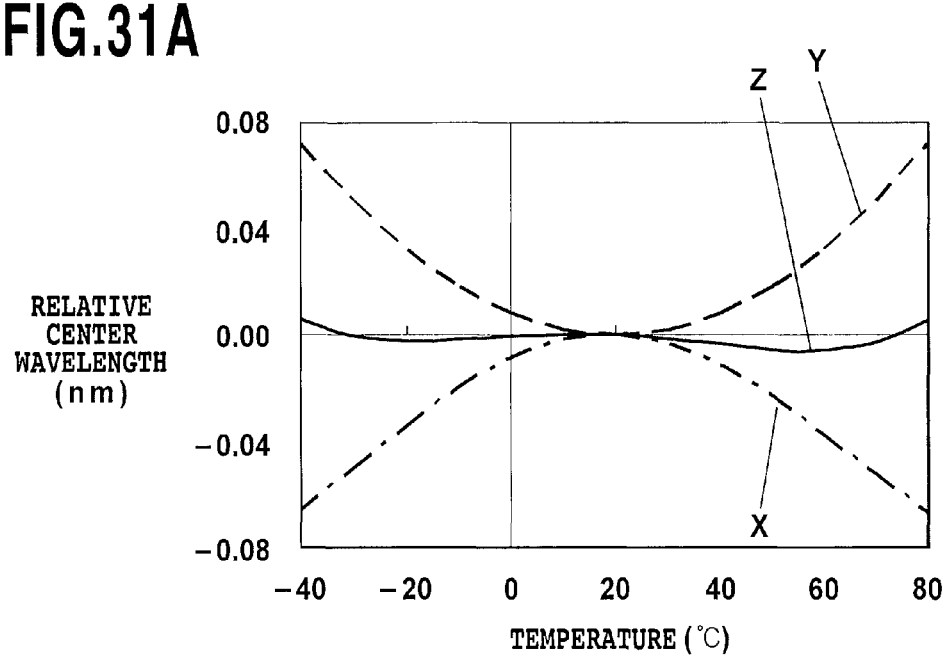
FIG. 31A is a graph showing a variation with temperature in the transmission center wavelength in the fifth embodiment of the present invention.

FIG. 31A is a graph for explaining the variation with temperature in the transmission center wavelength in the athermal AWG of the present embodiment. The line X indicates the variation with temperature in the transmission center wavelength due to the variation in the peak position in the optical field at the end of the linear taper 2711. The line Y indicates the high-order temperature dependence at the transmission center wavelength remained in the AWG in which the primary temperature dependence has been compensated from the first slab waveguide 2702 to the second input/output waveguides 2705. The temperature dependence at the transmission center wavelength of the whole AWG circuit is indicated as the line Z.

Figure 31B:
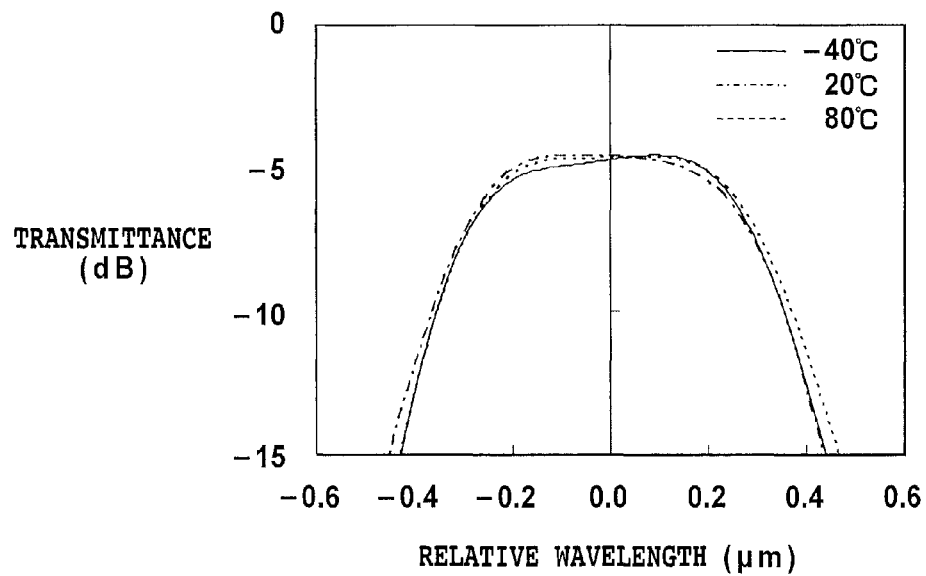
FIG. 31B is a graph showing a transmission waveform at each temperature in the fifth embodiment of the present invention.

FIG. 31B is a graph showing the transmission waveform at temperatures −40, 20 and 80° C. in the athermal AWG of the present embodiment. When the twin-peak-shaped field is excited in the parabola tapered waveguide 2711, a waveform with a wide transmission band is realized. In the parabola tapered waveguide 2717, the first mode light is not excited, and therefore, the variation with temperature in the transmission center wavelength is suppressed while the symmetry of the transmission waveform is substantially maintained in the operating temperature range.

From FIG. 31A and FIG. 31B, in the optical wavelength multiplexing and demultiplexing circuit in the present embodiment, it can be seen that the variation with temperature in the transmission center wavelength is suppressed to 0.011 nm in the range of −40 to 80° C., having a wide transmission band and a transmission waveform hardly varies, and the high-order variation with temperature in the transmission center wavelength remained in the athermal AWG by the conventional art is compensated.

(Sixth Embodiment)

Figure 32:
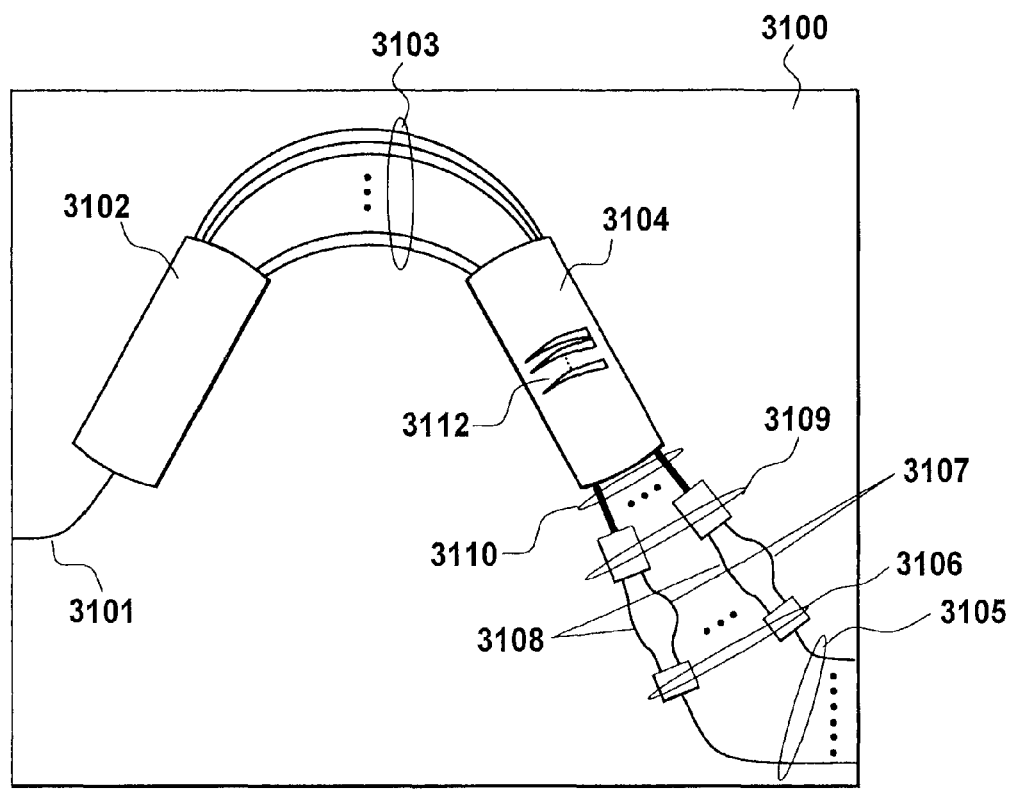
FIG. 32 is a diagram showing a configuration example of an athermal AWG according to a sixth embodiment of the present invention.

FIG. 32 is a configuration example of an athermal AWG according to a sixth embodiment of the present invention. The athermal AWG 3100 comprises a first input/output waveguide 3101, a first slab waveguide 3102, arrayed waveguides 3103, a second slab waveguide 3104 and second input/output waveguides 3105. The athermal AWG 3100 further comprises an optical splitter 3106, a first arm waveguide 3107, a second arm waveguide 3108, an optical mode combining coupler 3109 and a multimode waveguide 3110 between the first input/output waveguide 3101 and the first slab waveguide 3102. In the second slab waveguide 3104, grooves 3112 are formed, which are filled with a temperature compensating material.

The length of the arrayed waveguides 3103 is designed so as to increase in length successively by a fixed amount ΔL. In parallel with this, the length for the light wave, which passes through respective arrayed waveguides and passes through the center wavelength channel, disturbed by the grooves 3112 in the second slab waveguide 3104 increases successively by an amount ΔL' in proportion to ΔL. In the athermal AWG, the waveguide has a relative refractive index difference Δ of 1.5%, a core thickness of 4.5 μm, a temperature coefficient of effective refractive index α=1.0×10$^{-5}$+1.9×10$^{-8}$×T. The core width of the first input/output waveguide 3101, the arrayed waveguides 3103, the second input/output waveguides 3105, the first arm waveguides 3107, and the second arm waveguides 3108 is 4.5 μm. The number of wavelength channels is 32, the transmission wavelength of the center wavelength channel is 1,544.53 nm (194.1 THz), the wavelength channel interval is 0.8 nm (100 GHz), and the temperature compensating material is silicone resin (temperature coefficient of refractive index α'=−3.5×10$^{-4}$+1.5×10$^{-7}$×T). In this case, the number of the arrayed waveguides is 150 and ΔL is 42.4 μm.

The path length difference ΔL' given by the temperature compensating material filled in the groove 3112 is designed to be ΔL'=ΔL/(1−α'/α)=1.18 μm assuming that T=20° C., thereby the primary temperature dependence at the transmission center wavelength is compensated. Further, the length of the first slab waveguide 3102 and the second slab waveguide 3104 is 7,300 μm and the waveguides from the multimode waveguides 3110 to the second input/output waveguides 3105 are arranged as many as the number of the wavelength channels, i.e., 32 and the multimode waveguides 3110 are arranged at intervals of 18 μm on the connected part to the second slab waveguide 3104.

Figure 33:
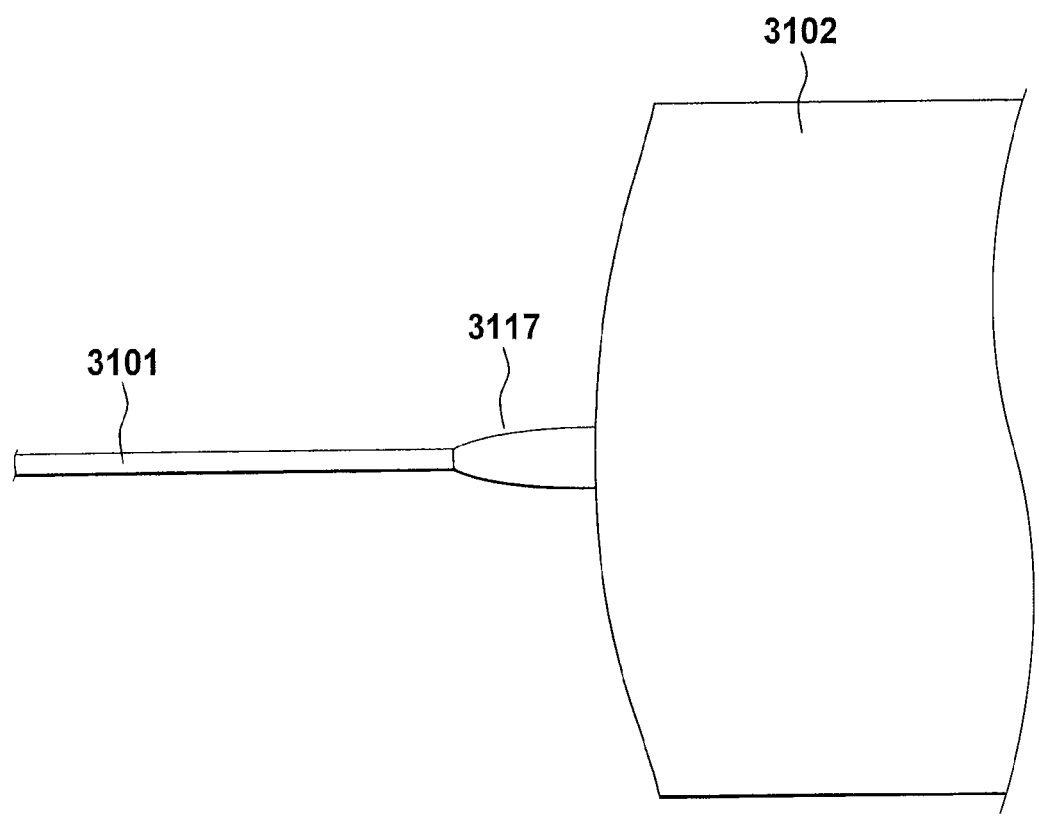
FIG. 33 is an enlarged view of a connection part of a first input/output waveguide and a first slab waveguide in FIG. 32.

FIG. 33 is an enlarged view of the vicinity of the connection part of the first input/output waveguide 3101 and the first slab waveguide 3102 in the athermal AWG in FIG. 32. Reference numerals are the same as those in FIG. 32. However, in the present embodiment, the first input/output waveguide 3101 is connected to the first slab waveguide 3102 via a parabolic tapered waveguide 3117. The waveguide width of the parabola tapered waveguide 3711 is 16 μm at the connected part to the first slab waveguide 3102.

At the end of the parabola tapered waveguide 3117, part of the fundamental mode light is converted into the 2nd mode light, turning to a twin-peak-shaped field. In this case, the power ratio and the phase difference between the fundamental mode light and the 2nd mode light are determined by the shape of the parabola tapered waveguide 3117, which hardly change with temperature. Because the shape of the parabola tapered waveguide 3117 is symmetric with respect to the center axis, the first mode light is not excited.

Figure 34:
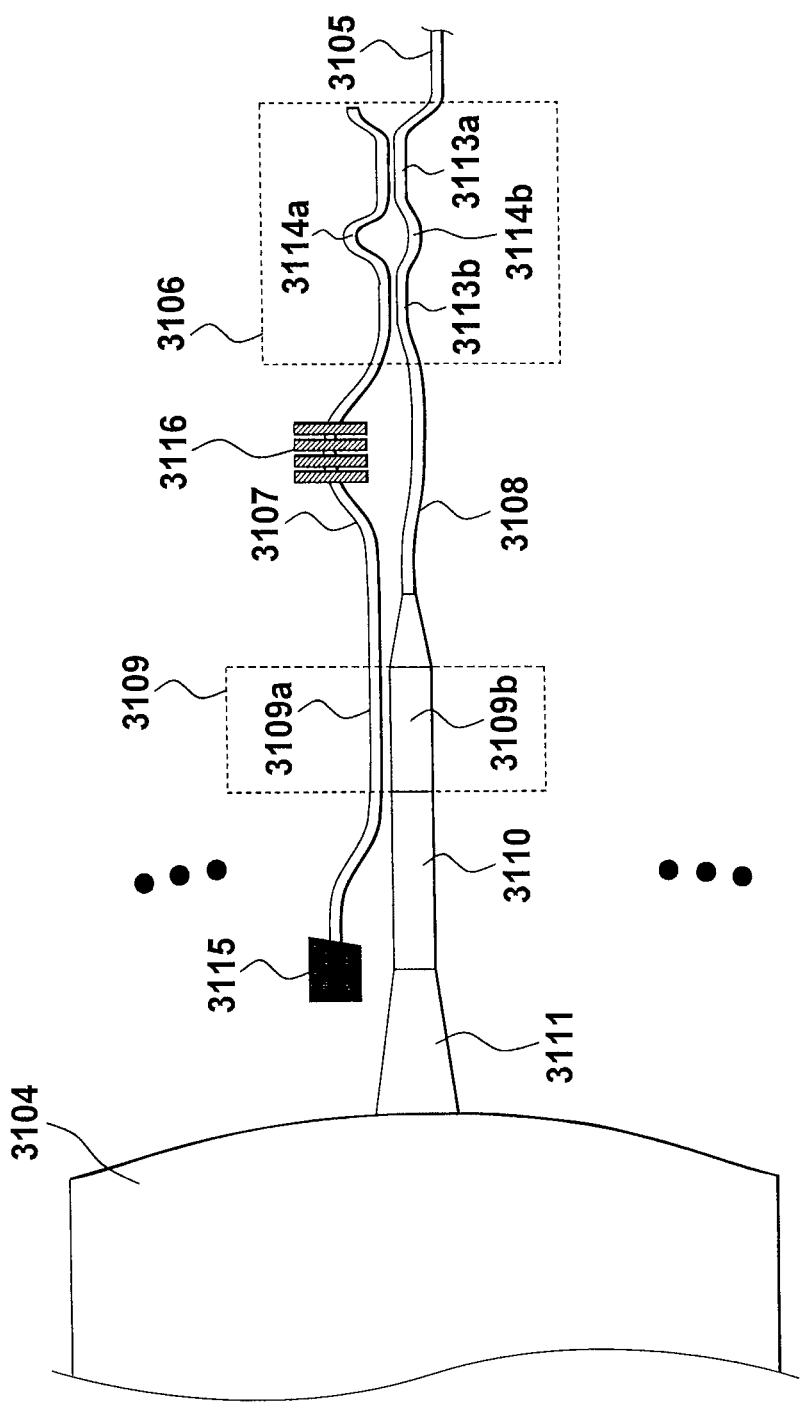
FIG. 34 is an enlarged view of a portion from an optical splitter to a multimode waveguide in FIG. 32.
Figure 35A:
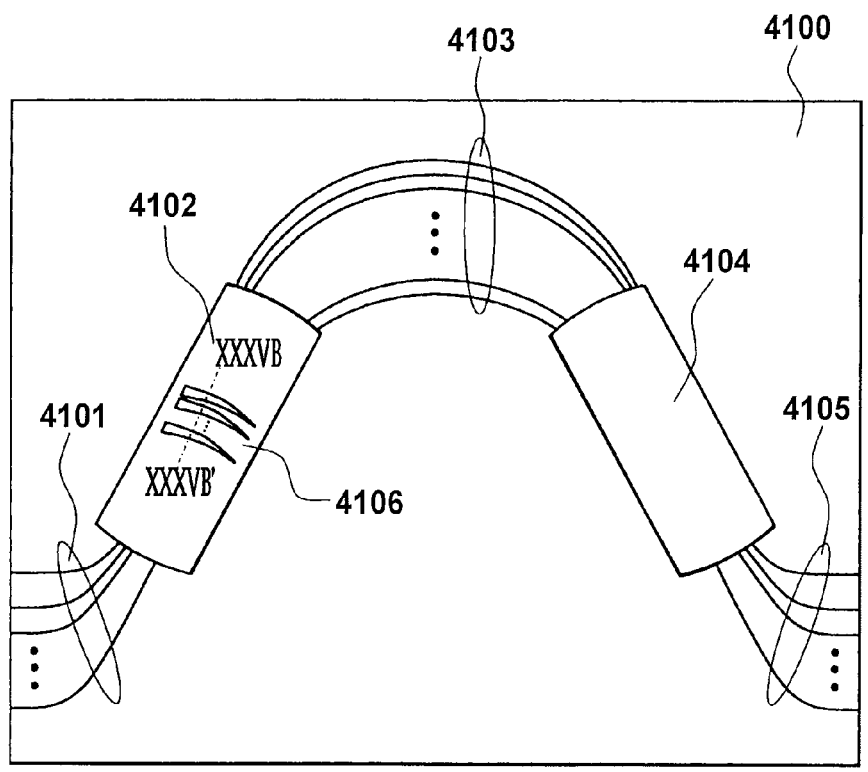
FIG. 35A is a plane view showing a conventional configuration example of an athermal AWG of a type forming a groove in a slab waveguide.
Figure 35B:
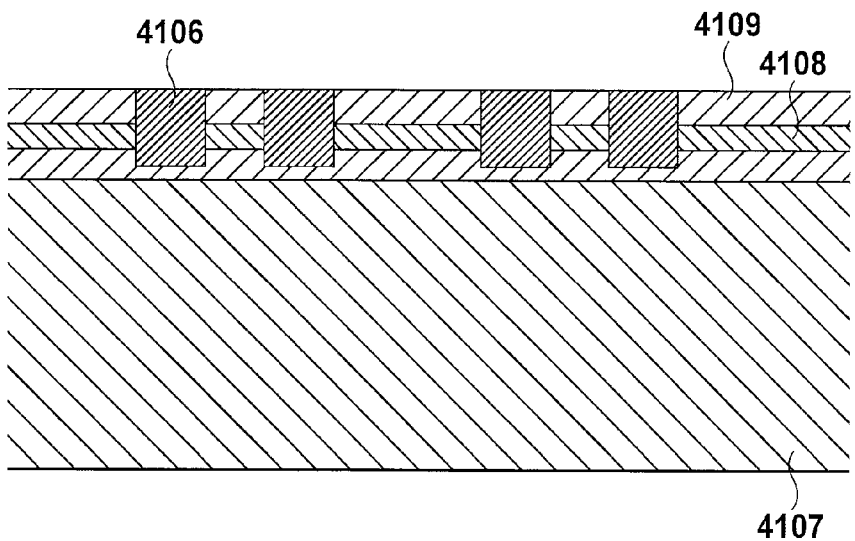
FIG. 35B is a section view along a segment XXXVB-XXXVB' in FIG. 35A.
Figure 36:
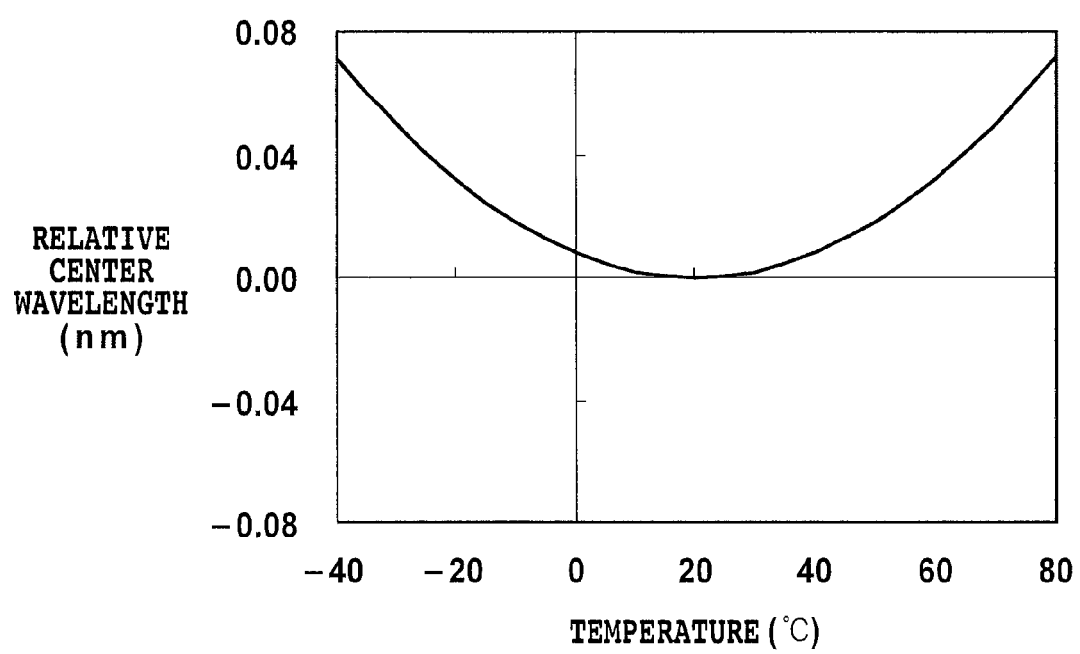
FIG. 36 is a diagram showing the temperature dependence at the transmission center wavelength of the conventional athermal AWG in FIG. 35.

FIG. 34 is an enlarged view of a portion from the optical splitter 3106 to the multimode waveguide 3110 in the athermal AWG in FIG. 32. In this figure, for simplicity, only one channel structure is shown. In reality, a plurality of input/output waveguides having the same structure is arranged side by side. Reference numerals are the same as those in FIG. 32. In the present embodiment, the multimode waveguide 3110 is connected to the second slab waveguide 3104 via a linearly tapered waveguide 3111. The waveguide width of the multimode waveguide 3110 is 8 μm and the waveguide width of the linearly tapered waveguide 3111 is 10 μm at the connected part to the second slab waveguide 3104.

As the optical splitter 3106, an WINC is used, which is composed of directional couplers 3113a and 3113b and arm waveguides 3114a and 3114b. The coupling rates of the directional couplers 3113a, 3113b are 86% and 97%, respectively, the optical path length difference of the arm waveguide 3114a with respect to the arm waveguide 3114b is 0.45 μm, and the WINC functions as an optical splitter having a branching ratio of 11%.

As the optical mode combining coupler 3109, a directional coupler having an asymmetric waveguide width is used and the width of a waveguide 3109a connected to the first arm waveguide 3107 is set to 2.5 μm, the width of a waveguide 3109b connected to the second arm waveguide 3108 is set to 8 μm, and the length of the waveguides 3109a, 3109b is set to 500 μm. The waveguide width from the second arm waveguide 3108 to the waveguide 3109b is smoothly converted by a linear taper. The coupling rate of the optical mode combining coupler 3109 from the waveguide 3109a to the waveguide 3109b is designed to be 70%.

An output waveguide connected to the waveguide 3109a is terminated by a groove 3115 and a light-blocking material is inserted into the groove 3115, such as absorbing light waves. The boundary surface between the light-blocking material and the output waveguide is not vertical to the waveguide, but inclined by 8 degrees from the vertical plane.

In the middle of the first arm waveguide 3107, a groove 3116 is formed and filled with silicone resin (temperature coefficient of refractive index $\alpha'=-3.5\times10^{-4}+1.5\times10^{-7}\times T$), which is a temperature compensating material. The groove 3116 is divided into four pieces and the total length of the first arm waveguide 3107 disturbed by the divided grooves is so as to be 23 µm and the interval from the end face to end face of the neighboring grooves is set to 15 µm.

The change with temperature in the optical path length difference of the first arm waveguide 3107 with respect to the second arm waveguide 3108 in each channel in the present embodiment is the same as that in FIG. 10. Note that the operating temperature range of the optical wavelength multiplexing and demultiplexing circuit is −40 to 80° C. In this operating temperature range, the optical path length difference changes from +0.50 µm to −0.50 µm. Due to this, the phase difference between the fundamental mode light and the first mode light generated in the optical mode combining coupler 3109 will change by 1.3π. Along with this phase change, at the connection part of the linear taper 3111 and the second slab waveguide 3104, the similar change with temperature in the optical field as that in FIG. 8B occurs.

The variation with temperature in the transmission center wavelength in the athermal AWG in the present embodiment is the same as that in FIG. 31A. In the present embodiment, the line X indicates the variation with temperature in the transmission center wavelength due to the variation in the peak position in the optical field at the end of the linear taper 3111. The line Y indicates the high-order temperature dependence at the transmission center wavelength remained in the AWG in which the primary temperature dependence has been compensated from the first input/output waveguide 3101 to the second slab waveguide 3104. The line Z indicates the temperature dependence at the transmission center wavelength of the whole AWG circuit.

The graph showing the transmission waveform at temperatures −40, 20 and 80° C. in the athermal AWG of the present embodiment is the same as that in FIG. 31B. As with the fifth embodiment, when the twin-peak-shaped field is excited in the parabola tapered waveguide 3117, a waveform with a wide transmission band is realized. In the parabola tapered waveguide 3117, the first mode light is not excited, and therefore, the variation with temperature in the transmission center wavelength is suppressed while the symmetry of the transmission waveform is substantially maintained in the operating temperature range.

From the above, in the optical wavelength multiplexing and demultiplexing circuit in the present embodiment, it can be seen that the variation with temperature in the transmission center wavelength is suppressed to 0.011 nm in the range of −40 to 80° C., having a wide transmission band and a transmission waveform hardly varies, and the high-order variation with temperature in the transmission center wavelength remained in the athermal AWG by the conventional art is compensated.

From the six embodiments described above, according to the athermal AWG type optical wavelength multiplexing and demultiplexing circuit of the present invention, an optical wavelength multiplexing and demultiplexing circuit can be obtained, in which the high-order variation with temperature in the transmission center wavelength remained in the athermal AWG by the conventional art is compensated and which is superior in the transmission center wavelength precision compared to the conventional one. However, in view of many embodiments for which the principles of the present invention can be applied, the embodiments described herein are merely examples and do not limit the scope of the present invention. The embodiments illustrated herein can be changed in their configurations and details without departing from the scope of the present invention. Further, the elements and procedures for explanation may be modified, supplemented, or changed in order without departing from the scope of the present invention.

For example, in the embodiments, the relative refractive index difference of the waveguide, the core width, and the core thickness are limited to the specific values. However, the scope of the present invention is not limited to these values.

In the embodiments, the design parameters of the AWG are limited to the specific values. However, the scope of the present invention is not limited to these parameters.

In the embodiments, the operating temperature range is limited to the specific values, and however, the scope of the present invention is not limited to these values.

In the embodiments, the number of divided grooves is limited to the specific value, and however, the scope of the present invention is not limited to this number.

In the embodiments, as the temperature compensating material, silicone resin is used. However, the scope of the present invention is not limited to this material and any material having a temperature coefficient of refractive index different from the temperature coefficient of effective refractive index of the waveguide can be applied. For example, besides silicone resin, optical resin such as epoxy resin and fluorine resin, can be used.

In the above embodiments, as the mechanism of giving the temperature dependence to the optical path length difference of the first arm waveguide with respect to the second arm waveguide, the configuration is applied, in which the groove is formed on the arm waveguide or in the vicinity thereof and the temperature compensating material is inserted. However, the scope of the present invention is not limited to this configuration and any configuration that gives predetermined temperature dependence to the optical path length difference can be applied. For example, a configuration can also be applied, in which part of the arm waveguide is replaced with a waveguide formed by a material different from that of the waveguide forming the AWG.

In the first, fourth, fifth and sixth embodiments, in the configuration for compensating for the primary temperature dependence, the groove is formed in the second slab waveguide and the temperature compensating material is inserted. However, the scope of the present invention is not limited to this position and the primary temperature dependence can be compensated by arranging the groove in any position of the optical path from the first slab waveguide to the second slab waveguide via the arrayed waveguides or arranging the grooves in a plurality of different positions in a distributed manner.

In the fourth, fifth and sixth embodiments, the parabola tapered waveguide is applied to the connection part of the first or second input/output waveguide and the slab waveguide. However, the scope of the present invention is not limited to this configuration and any tapered waveguide which converts part of the fundamental mode light into the 2nd mode light, for example, a Y branch waveguide, an elliptic waveguide, an MMI, etc., can also be applied.

The invention claimed is:

1. An arrayed waveguide grating comprising:
an athermal arrayed waveguide grating comprising a first slab waveguide, arrayed waveguides and a second slab waveguide, wherein a main temperature dependence of the athermal arrayed waveguide grating at a transmission center wavelength is compensated for;
a first input/output waveguide;
an optical splitter connected to the first input/output waveguide;
a first arm waveguide and a second arm waveguide each connected to the optical splitter, the first and second arm waveguides having an optical path length difference therebetween, wherein the absolute value of the optical path length difference is less than or equal to ten times the transmission center wavelength for a central temperature of an operating temperature of the athermal arrayed waveguide grating;
an optical mode combining coupler connected to the first and second arm waveguides and for coupling fundamental mode light from the first arm waveguide as fundamental mode and fundamental mode light from the second arm waveguide as first mode; and
a mechanism for varying the transmission center wavelength with respect to temperature so as to compensate for temperature dependence of the transmission center wavelength remaining in the athermal arrayed waveguide grating, by changing a phase difference between the first mode light and the fundamental mode light according to a change in temperature so as to vary a light intensity peak in an optical field incident to the first slab waveguide, wherein the mechanism comprises a groove formed in at least one of the first and second arm waveguides and filled with a temperature compensating material so as to change the optical path length difference between the first and second arm waveguides with temperature.

2. The arrayed waveguide grating according to claim 1, further comprising a multimode waveguide connected to the optical mode combining coupler, capable of propagating at least fundamental and first mode light, and connected to the first slab waveguide.

3. The arrayed waveguide grating according to claim 1, wherein the groove is comprised of a plurality of grooves.

4. An arrayed waveguide grating comprising:
an athermal arrayed waveguide grating comprising a first slab waveguide, arrayed waveguides and a second slab waveguide, wherein a main temperature dependence of the athermal arrayed waveguide grating at a transmission center wavelength is compensated for;
a first input/output waveguide;
an optical splitter connected to the first input/output waveguide;
a first arm waveguide and a second arm waveguide each connected to the optical splitter, the first and second arm waveguides having an optical path length difference therebetween, wherein the absolute value of the optical path length difference is less than or equal to ten times the transmission center wavelength for a central temperature of an operating temperature of the athermal arrayed waveguide grating;
a mechanism for varying the transmission center wavelength with respect to temperature so as to compensate for temperature dependence of the transmission center wavelength remaining in the athermal arrayed waveguide grating, by changing a phase difference between light from the first arm waveguide and light from the second arm waveguide according to a change in temperature so as to vary a light intensity peak in an optical field incident to the first slab waveguide, wherein the mechanism comprises a groove formed in the vicinity of at least one of the first and second arm waveguides and filled with a temperature compensating material so as to change the optical path length difference between the first and second arm waveguides with temperature.

5. The arrayed waveguide grating according to claim 1, wherein the waveguide is comprised of silica based glass, and wherein the temperature compensating material is an optical resin including at least one of silicone resin, epoxy resin and fluorine resin.

6. The arrayed waveguide grating according to claim 2, wherein the multimode waveguide is connected to the first slab waveguide via a tapered waveguide.

7. The arrayed waveguide grating according to claim 2, wherein the multimode waveguide is connected to the first slab waveguide via a parabolic tapered waveguide.

8. The arrayed waveguide grating according to claim 1, further comprising a second input/output waveguide connected to the second slab waveguide, wherein the second input/output waveguide is connected to the second slab waveguide via a parabolic tapered waveguide.

9. The arrayed waveguide grating according to claim 1, wherein the optical splitter is configured as a wavelength insensitive coupler.

10. The arrayed waveguide grating according to claim 1, wherein a light intensity branching ratio of the optical splitter to the first arm waveguide is less than 50%, and wherein the groove is formed only in the first arm waveguide.

11. The arrayed waveguide grating according to claim 10, wherein the light intensity branching ratio of the optical splitter to the first arm waveguide is less than 20%.

12. The arrayed waveguide grating according to claim 1, wherein the optical mode combining coupler is a directional coupler comprising two waveguides with different widths.

13. The arrayed waveguide grating according to claim 12, wherein a width of a narrower waveguide of the directional coupler gradually decreases.

14. The arrayed waveguide grating according to claim 12, wherein the directional coupler further comprises a groove for terminating a narrower waveguide, wherein the groove is filled with a light-blocking material for attenuating light.

15. The arrayed waveguide grating according to claim 1, wherein the optical mode combining coupler comprises two multimode interference couplers coupled in a cascade.

16. The arrayed waveguide grating according to claim 1, wherein the main temperature dependence at the transmission center wavelength of the athermal arrayed waveguide grating is compensated for by a groove formed in at least one of the first slab waveguide, the arrayed waveguide and the second slab waveguide, and filled with a temperature compensating material.

17. The arrayed waveguide grating according to claim 16, wherein the temperature compensating material is an optical resin including at least one of silicone resin, epoxy resin and fluorine resin.

18. The arrayed waveguide grating according to claim 1, wherein the main temperature dependence at the transmission center wavelength of the athermal arrayed waveguide grating is compensated for by deforming the shape of a metal plate by thermal expansion and contraction.

19. The arrayed waveguide grating according to claim 1, wherein the main temperature dependence at the transmission center wavelength of the athermal arrayed waveguide grating is compensated for by dividing the first slab waveguide or the second slab waveguide and changing their relative positions by thermal expansion and contraction of a metal plate.

20. An arrayed waveguide grating comprising:
   an athermal arrayed waveguide grating having a transmission center wavelength, the athermal arrayed waveguide grating being arranged to compensate for temperature dependent variations in the transmission center wavelength, and to operate within an operating temperature range, the athermal arrayed waveguide grating comprising:
      a first slab waveguide;
      a second slab waveguide; and
      a plurality of arrayed waveguides extending between the first and second slab waveguides;
   an optical mode combining coupler coupled with the first slab waveguide;
   an optical splitter;
   a first input/output waveguide connected to the optical splitter;
   a first arm waveguide and a second arm waveguide each extending between the optical splitter and the optical mode combining coupler, the optical mode combining coupler being configured to couple fundamental mode light from the first and second arm waveguides respectively as fundamental mode and first mode, the first and second arm waveguides having an optical path length difference therebetween, wherein the absolute value of the optical path length difference is less than or equal to ten times the transmission center wavelength of the athermal arrayed waveguide grating at a central temperature of the operating temperature range; and
   a mechanism for varying the transmission center wavelength with respect to temperature so as to compensate for temperature dependence of the transmission center wavelength remaining in the athermal arrayed waveguide grating, by changing a phase difference between the first mode light and the fundamental mode light according to a change in temperature so as to vary a light intensity peak in an optical field incident to the first slab waveguide, the mechanism comprising:
      a groove formed in at least one of the first and second arm waveguides; and
      a temperature compensating material positioned within the groove so as to change the optical path length difference between the first and second arm waveguides with temperature.

* * * * *